(12) United States Patent
Zhou

(10) Patent No.: US 12,472,433 B2
(45) Date of Patent: Nov. 18, 2025

(54) VIRTUAL WORLD SOUND-PROMPTING METHOD, APPARATUS, DEVICE AND STORAGE MEDIUM

(71) Applicant: TENCENT TECHNOLOGY (SHENZHEN) COMPANY LIMITED, Guangdong (CN)

(72) Inventor: Jing Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 286 days.

(21) Appl. No.: 18/322,031

(22) Filed: May 23, 2023

(65) Prior Publication Data
US 2023/0285859 A1 Sep. 14, 2023

Related U.S. Application Data

(63) Continuation of application No. PCT/CN2022/102593, filed on Jun. 30, 2022.

(30) Foreign Application Priority Data

Aug. 5, 2021 (CN) .......................... 202110898406.6

(51) Int. Cl.
A63F 13/54 (2014.01)
A63F 13/533 (2014.01)
A63F 13/537 (2014.01)

(52) U.S. Cl.
CPC ............ *A63F 13/54* (2014.09); *A63F 13/533* (2014.09); *A63F 13/537* (2014.09)

(58) Field of Classification Search
CPC ...... A63F 13/537; A63F 13/533; A63F 13/54; A63F 13/5372
See application file for complete search history.

(56) References Cited

U.S. PATENT DOCUMENTS 9,348,488 B1 * 5/2016 Renema, II ......... G06F 3/04817
9,952,755 B2 * 4/2018 Ogiso .................. G06F 3/04845
(Continued)

FOREIGN PATENT DOCUMENTS

CN 107890673 A 4/2018
CN 108854069 A 11/2018
(Continued)

OTHER PUBLICATIONS

ItsJerian, "All The New Changes From The Secret Update!—Fortnite Battle Royale", Apr. 15, 2020, Youtube.com, pp. 1-3, at https://www.youtube.com/watch?v=4f_SD8ahpCY (last visited May 1, 2024). (Year: 2020).*

(Continued)

*Primary Examiner* — Steve Rowland
(74) *Attorney, Agent, or Firm* — Sughrue Mion, PLLC

(57) ABSTRACT

A virtual world sound-prompting method, apparatus, device, and a storage medium, and belongs to the field of human-computer interaction. The method includes: displaying a visual screen of a first virtual character, the virtual screen displaying compass information comprising an azimuth scale sequence, and an azimuth scale in the azimuth scale sequence indicating a horizontal azimuth that the first virtual character faces in a virtual world. controlling the first virtual character to perform an action in the virtual world, and displaying a first sound indicator based on a first azimuth scale in the azimuth scale sequence based a first sound source located in surroundings of the first virtual character during the action of the first virtual character in the virtual world, the first sound indicator indicating a horizontal azimuth and a vertical azimuth corresponding to the first sound source.

16 Claims, 14 Drawing Sheets

(56) References Cited

U.S. PATENT DOCUMENTS

| | | | | |
|---|---|---|---|---|
| 10,603,589 | B2* | 3/2020 | Miyamoto | A63F 13/56 |
| 2001/0046896 | A1* | 11/2001 | Miyamoto | A63F 13/5252 |
| | | | | 463/31 |
| 2011/0172013 | A1* | 7/2011 | Shirasaka | A63F 13/92 |
| | | | | 345/173 |
| 2011/0283865 | A1* | 11/2011 | Collins | G06F 3/16 |
| | | | | 84/464 R |
| 2012/0142429 | A1* | 6/2012 | Muller | A63F 13/69 |
| | | | | 463/42 |
| 2014/0240313 | A1* | 8/2014 | Varga | H04N 13/383 |
| | | | | 345/419 |
| 2018/0024660 | A1* | 1/2018 | Wang | G06F 3/04817 |
| | | | | 273/110 |
| 2018/0164801 | A1* | 6/2018 | Kim | G08G 5/26 |
| 2019/0076739 | A1 | 3/2019 | Ge | |
| 2019/0126148 | A1* | 5/2019 | Wei | A63F 13/2145 |
| 2020/0408521 | A1* | 12/2020 | Lyons | G04G 21/04 |
| 2021/0379491 | A1* | 12/2021 | Liu | A63F 13/837 |

FOREIGN PATENT DOCUMENTS

| | | |
|---|---|---|
| CN | 111991800 A | 11/2020 |
| CN | 113559504 A | 10/2021 |
| JP | 2019-63506 A | 4/2019 |
| TW | 201931354 A | 8/2019 |

OTHER PUBLICATIONS

International Search Report for PCT/CN2022/102593 dated Sep. 26, 2022 [PCT/ISA/210].

Communication issued May 7, 2025 in Japanese Application No. 2023-571572.

Communication issued May 24, 2025 in Chinese Application No. 202110898406.6.

* cited by examiner

| ▲ Sound information | | | 1200 |
|---|---|---|---|
| Increased acoustic amplitude coefficient — 1201 | 1.2 | ◪ | |
| Sound volume influence coefficient — 1202 | 1.0 | ◪ | |
| Influence coefficient at the maximum distance of the sound — 1203 | 1.0 | ◪ | |

FIG. 12

| Sound volume influence coefficient of the muffler — 1301 | 1.0 | ◪ | 1300 |
|---|---|---|---|
| Influence coefficient at the maximum distance of the sound of the muffler — 1302 | 0.5 | ◪ | |

FIG. 13

| ▲ Configuration mapping of influence of tread material — 1410 | | | 1400 |
|---|---|---|---|
| ▲ Marble metal ▼ | 2 configurable parameters | | |
| Sound volume influence coefficient — 1401 | 1.0 | ◪ | |
| Influence coefficient at the maximum distance of the sound — 1402 | 1.0 | ◪ | |

FIG. 14

VIRTUAL WORLD SOUND-PROMPTING METHOD, APPARATUS, DEVICE AND STORAGE MEDIUM

CROSS REFERENCE TO RELATED APPLICATION(S)

The present application is a continuation application of International Application No. PCT/CN2022/102593 filed on Jun. 30, 2022, which claims priority to Chinese Patent Application No. 202110898406.6 filed with the China National Intellectual Property Administration on Aug. 5, 2021, the disclosures of which are incorporated herein by reference in their entireties.

FIELD

Embodiments of the disclosure relate to the field of human-computer interaction, in particular to a virtual world sound-prompting method, apparatus, device and storage medium.

BACKGROUND

A user may operate the game characters in a game program for athletics opposition. The game program is provided with a virtual world, and the game characters are virtual characters in the virtual world.

A game screen and a mini-map control are displayed on a terminal. The game screen is a screen from which the virtual world is observed from a perspective of the current game character, and the mini-map control is a control for displaying a top view map of the virtual world. When there are other game characters around the current game character, if the other game characters produce sound while acting in the virtual world, a sound icon is displayed on the mini-map control, thereby prompting a gunshot, a footstep sound, a muffler sound, etc. in a mini-map space according to the sound icon. For example, a point A on the mini-map control is displayed with a sound icon which is feet print, indicating that there are other game characters walking at a position corresponding to the point A on the mini-map control in the virtual world.

Since the display area of the mini-map control is limited, the above-mentioned sound icon cannot provide a specific position of the sound source in the virtual world, effective information that may be provided is limited, and it is difficult for the user to determine the position of the sound source conveniently and quickly from the prompt of the sound icon, which is not advantageous for the game character to face with a stronger competition in the virtual world.

SUMMARY

Some embodiments of the disclosure provides a virtual world sound-prompting method, apparatus, device, and a storage medium, by which a horizontal azimuth and a vertical azimuth of a sound source in the virtual world may be simultaneously indicated via a sound indicator.

Some embodiments provide a virtual world sound-prompting method, performed by a terminal, including:
  displaying a visual screen of a first virtual character, the visual screen displaying compass information comprising an azimuth scale sequence, an azimuth scale in the azimuth scale sequence indicating a horizontal azimuth that the first virtual character faces in a virtual world; and
  controlling the first virtual character to perform an action in the virtual world;
  displaying a first sound indicator based on a first azimuth scale in the azimuth scale sequence based on a first sound source located in surroundings of the first virtual character during the action of the first virtual character in the virtual world, the first sound indicating a horizontal azimuth and a vertical azimuth corresponding to the first sound source.

Some embodiments provide a virtual world sound-prompting apparatus including:
  at least one memory configured to store program code; and
  at least one processor configured to read the program code and operate as instructed by the program code, the program code comprising:
  display code configured to cause the at least one processor to display a visual screen of a first virtual character, the virtual screen displaying compass information comprising an azimuth scale sequence, and an azimuth scale in the azimuth scale sequence indicating a horizontal azimuth that the first virtual character faces in a virtual world;
  control code configured to cause the at least one processor to control the first virtual character to perform an action in the virtual world, wherein
  the display code is further configured to cause the at least one processor to display a first sound indicator based on a first azimuth scale in the azimuth scale sequence based on a first sound source located in surroundings of the first virtual character during the action of the first virtual character in the virtual world, the first sound indicator indicating a horizontal azimuth and a vertical azimuth corresponding to the first sound source.

Some embodiments provide a computer device including: a processor and a memory having stored therein at least one program loaded and executed by the processor to implement the virtual world sound-prompting method.

Some embodiments, provide a non-transitory computer-readable storage medium storing computer code that when executed by at least one processor causes the at least one processor to implement the virtual world sound-prompting method.

Some embodiments provide a computer program product which, when executed, causes the processor to implement the virtual world sound-prompting method.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

FIG. 12 is a configuration diagram showing influence of headphones on sound prompts according to some embodiments;

FIG. 13 is a configuration diagram showing influence of a muffler on sound prompts according to some embodiments;

FIG. 14 is a configuration diagram showing influence of tread material on sound prompts according to some embodiments;

DETAILED DESCRIPTION

Figure 1:
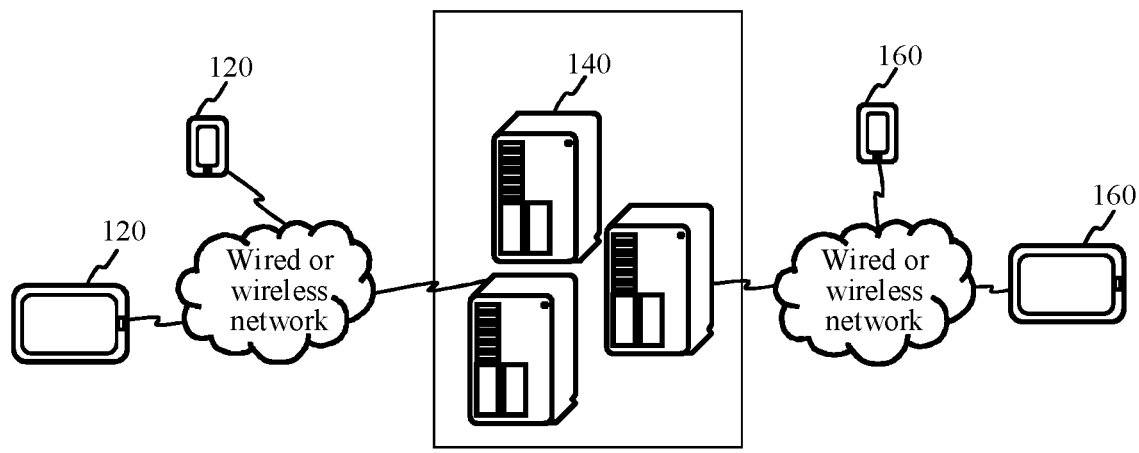
FIG. 1 is a block diagram showing a computer system according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

The technical solutions provided in some embodiments have at least the following beneficial effects:

when there is a first sound source in the surroundings of the first virtual character, since compass information is displayed on a visual screen where the first virtual character is located, and the compass information includes an azimuth scale sequence, a first sound indicator may be displayed based on the first azimuth scale in the azimuth scale sequence, and a horizontal azimuth and a vertical azimuth corresponding to the first sound source may be simultaneously indicated via the first sound indicator, so that a user may accurately determine a specific spatial position of the first sound source only by means of visual effect; in an auditory limited scene without the need for loud-speaking sound or using headphones, enough effective spatial information may also be obtained for the sound source to facilitate the first virtual character to face with a stronger competition in the virtual world.

In the following descriptions, related "some embodiments" describe a subset of all possible embodiments. However, it may be understood that the "some embodiments" may be the same subset or different subsets of all the possible embodiments, and may be combined with each other without conflict.

"Plurality of" mentioned in the specification means two or more. "And/or" describes an association relationship for describing associated objects and represents that three relationships may exist. For example, A/B may represent the following cases: Only A exists, both A and B exist, and only B exists. The character "I" in this specification generally indicates an "or" relationship between the associated objects.

Firstly, the nouns described in some embodiments are introduced:

Shooting games: remote attacks using remote attack weapons such as hot or cold weapons. For example, first-person shooting (FPS), third-person shooting (TPS), etc. In some embodiments, the first-person shooting is a shooting game played in the player's primary perspective, and the player no longer manipulates the virtual characters displayed in the screen to play the game as compared with other games, but is personally on the scene in the primary perspective to experience the visual impact from the game. The difference between the third-person shooting and the first-person shooting lies in that in the first-person shooting, only a difference of the view of a leading role is displayed on a screen, and a game character controlled by a player in the third-person shooting is visible on the game screen to highlight the sense of action.

Virtual world: it is a virtual world that an application program displays (or provides) when running on a terminal. The virtual world may be a three-dimensional virtual world or a two-dimensional virtual world. The three-dimensional virtual world may be a simulated environment for a real world, a semi-simulated semi-fictitious environment, or a purely fictitious environment. The following examples illustrate, but do not limit, that the virtual world is a three-dimensional virtual world. In some embodiments, the virtual world is also used for a virtual scene fight between at least two virtual characters. In some embodiments, the virtual scene is also used for fighting between at least two virtual characters using a virtual gun.

Virtual character: it refers to a movable object in a virtual world. The movable object may be a simulated character or an animated character in a virtual world. In some embodiments, when the virtual world is a three-dimensional virtual environment, the virtual object is a three-dimensional stereo model created according to an animated skeleton technology. Each virtual object has its own shape and sound volume in the three-dimensional virtual scene, occupying a portion of the space in the three-dimensional virtual scene. According to some embodiments, a virtual character may be an individual in a virtual world that may independently produce different sounds, which includes a first virtual character, a second virtual character, etc. respectively representing independent individuals producing different sounds. An individual who is producing a sound may act as a sound source.

Sound indicator: it is a visual control for indicating sound information in a virtual world and having one or more visual effect, and each visual effect is used for representing a kind of sound information including: at least one of a horizontal azimuth, a vertical azimuth, a sound type, a sound volume, a sound distance, and a frequency of action of a sound source.

Visual effect of a sound indicator: it refers to a display effect displayed on the sound indicator that may be visually captured by a user. Each visual effect includes: one or a combination of a shape, a pattern, a color, a texture, a text, an animation effect, a display-starting time, a display duration, and a blanking time of the first sound indicator. Different kinds of visual effects are different. In some embodiments, visual effects of different dimensions are superimposed simultaneously on the same sound indicator to present different information.

FIG. 1 illustrates a block diagram of a computer system according to some embodiments. The computer system 100 includes: a first terminal 120, a server cluster 140 and a second terminal 160.

The first terminal 120 is installed and runs a game program supporting a virtual environment. The game program may be a first-person shooting or a third-person shooting, etc. The first terminal 120 may be a terminal used by a first user, and the first user uses the first terminal 120 to operate a first virtual character located in a virtual world to move, and the action includes but is not limited to: at least one of sprint, climb, squat walk, quiet walk, quiet climb, quiet squat walk, single gunshot, continuous gunshots, Non-Player Character (NPC) cry, grass smear, cry due to wound, dying cry, explosion, and walk. In some embodiments, the first virtual character is a first virtual character.

The first terminal 120 is connected to a server cluster 140 through a wireless network or a wired network.

The server cluster 140 includes at least one of a server, a plurality of servers, a cloud computing platform, and a virtualization center. The server cluster 140 is used for providing background services for applications that support the virtual environment. In some embodiments, the server cluster 140 undertakes the primary computing work, and the first terminal 120 and the second terminal 160 undertake the secondary computing work; in some embodiments, the server cluster 140 undertakes the secondary computing work, and the first terminal 120 and the second terminal 160 undertake the primary computing work; in some embodiments, the server cluster 140, the first terminal 120 and the second terminal 160 perform cooperative computing therebetween using a distributed computing architecture.

The second terminal 160 is installed and runs a game program supporting a virtual environment. The game program may be a first-person shooting or a third-person shooting, etc. The second terminal 160 may be a terminal used by a second user, and the second user uses the second terminal 160 to operate a second virtual character located in a virtual world to move, and the action includes but is not limited to: at least one of sprint, climb, squat walk, quiet walk, quiet climb, quiet squat walk, single gunshot, NPC cry, grass smear, cry due to wound, dying cry, explosion, and walk. In some embodiments, the second virtual character is a second virtual character. The first virtual character and the second virtual character may belong to the same team, the same organization, have a friend relationship or have temporary communication authority.

In some embodiments, the applications installed on the first terminal 120 and the second terminal 160 are the same, or are the same type of application on different platforms. The first terminal 120 may generally refer to one of a plurality of terminals, and the second terminal 160 may generally refer to one of a plurality of terminals. For example, some embodiments may be only by the first terminal 120 and the second terminal 160.

The first terminal 120 and the second terminal 160 may be desktop devices or mobile devices. When the first terminal 120 and the second terminal 160 are mobile devices, the types of the mobile devices of the first terminal 120 and the second terminal 160 are the same or different, and the mobile devices include: smartphones, tablet computers, and all portable electronic devices including but not limited thereto.

Figure 2:
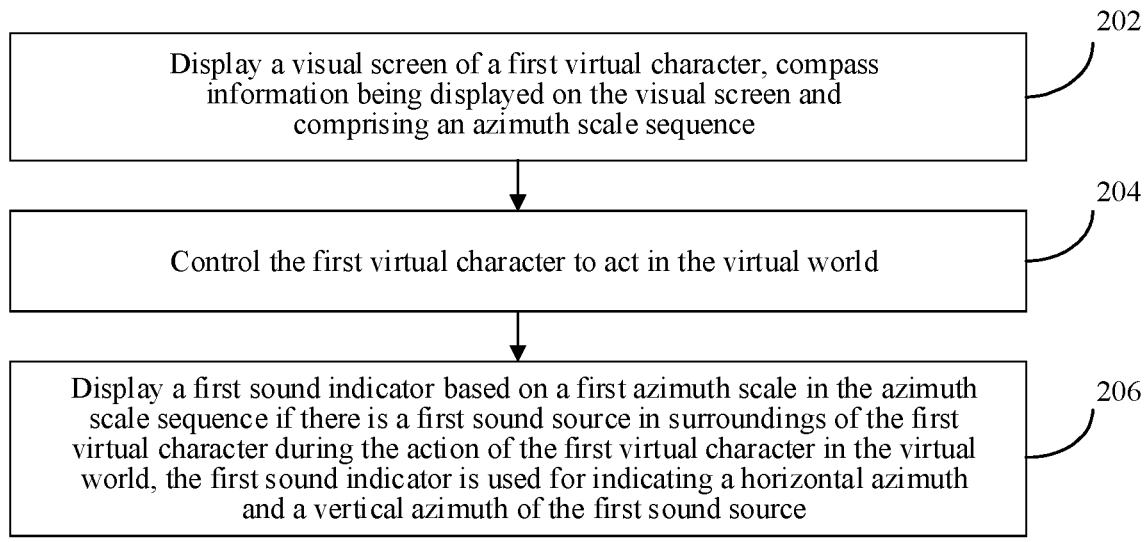
FIG. 2 is a flowchart showing a virtual world sound-prompting method according to some embodiments.

FIG. 2 is a flowchart of a virtual world sound-prompting method according to some embodiments. The method may be performed by a first terminal 120 or a second terminal 160 shown in FIG. 1, and the first terminal 120 or the second terminal 160 may be collectively referred to as a terminal, and the method includes:

Operation 202: Display a visual screen of a first virtual character, where compass information is displayed on the visual screen and includes an azimuth scale sequence;

the compass information (or compass control) is used for indicating, with the foothold of the first virtual character in the virtual world as a reference point, various horizontal azimuths to which the first virtual character faces in the virtual world. In some embodiments, the horizontal azimuth is represented by longitude in the virtual world, e.g., 20 degrees east longitude, 160 degrees west longitude, etc.

Figure 3:
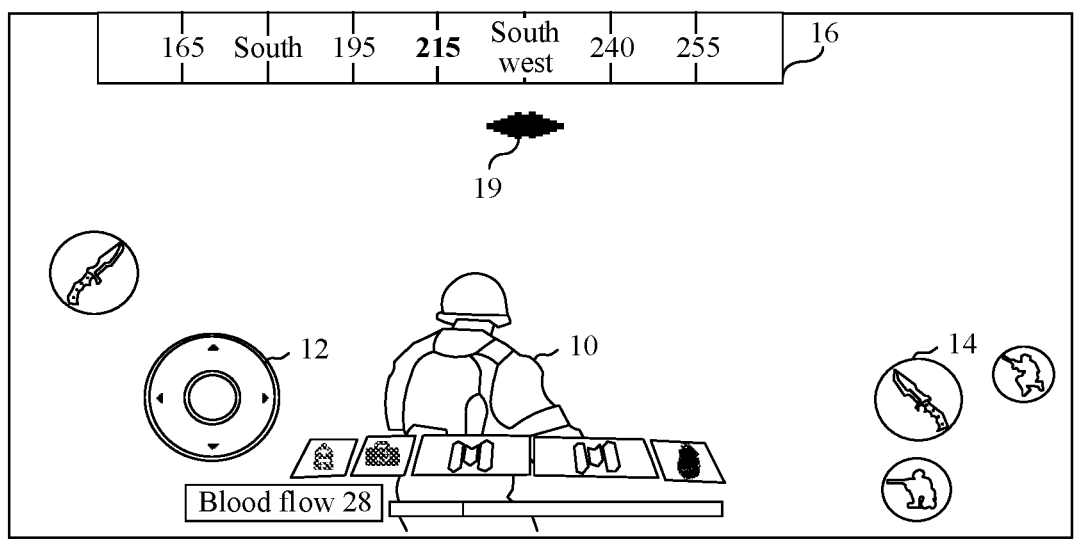
FIG. 3 is an interface diagram showing a virtual environment picture according to some embodiments.

In some embodiments, as shown in FIG. 3, a first virtual character 10, a moving wheel 12, a skill button 14, and compass information 16 are displayed on the visual screen. The first virtual character 10 may be any movable object in the virtual world, such as a soldier located in the virtual world. The moving wheel 12 is used for controlling the movement of the first virtual character 10 in the virtual world, and the skill button 14 is used to control the first virtual character 10 to show skills or use articles in the virtual world. The compass information 16 is displayed with an azimuth scale sequence which may be a sequence of a plurality of azimuth scales, and the azimuth scales in the azimuth scale sequence are used for indicating the horizontal azimuth the first virtual character faces in the virtual world. In FIG. 3, the azimuth scale sequence includes 7 azimuth scales: 165 degrees, south, 195 degrees, 215 degrees, southwest, 240 degrees, and 255 degrees. The azimuth scale of 215 degrees is used for indicating a horizontal azimuth directly in front of the first virtual character 10.

Operation 204: Control the first virtual character to act in the virtual world;

According to some embodiments, a user may control action of a first virtual character in a virtual world. The action herein may include various forms of activities such as moving, showing skills, using articles, etc. The different activities may be controlled differently, for example the user may control the first virtual character 10 to move by moving the wheel 12, or the user may control the first virtual character to show skills or use articles by pressing one or more preset skills buttons 14. The user may also control the first virtual character by a signal generated by a long press, click, double click and/or slide on the touch screen.

Operation 206: Display a first sound indicator based on a first azimuth scale in the azimuth scale sequence if there is a first sound source in surroundings of the first virtual character during the action of the first virtual character in the virtual world, where the first sound indicator is used for indicating a horizontal azimuth and a vertical azimuth of the first sound source.

In some embodiments, the surroundings of the first virtual character are a virtual environment within a three-dimensional sphere with the first virtual character as a center and a preset distance as a radius. In some embodiments, the surroundings of the first virtual character are a virtual environment with the first virtual character as a center, a preset distance as a radius and located within a three-dimensional hemisphere on the ground plane.

The first sound source may be a virtual element in the virtual world having sound producing capabilities, such as a second virtual character (friend or enemy or NPC), a virtual vehicle, a virtual flying object, various aggressive weapons, virtual animals, etc. The second virtual character may be a virtual character other than the first virtual character in the virtual world, and the number of the second virtual characters is at least one. Since the virtual world is a digitally simulated environment, the sound may refer to a sound event in the digitized world, and the sound event is represented by a set of parameters. A set of parameters for a sound event includes, but is not limited to: at least one of a three-dimensional coordinate of a sound source in a virtual world, a type of the sound source, a material type to which the sound source is exposed, a sound type, an original sound volume, and an equipment wearing condition of the sound source.

If there is a first sound source in the surroundings of the first virtual character, it is indicated that a virtual element (also referred to as an individual in the virtual world) in the surroundings produces a sound (e.g., a first sound), i.e., the first sound source, so that a first sound indicator may be displayed based on the first azimuth scale in the azimuth scale sequence. The first sound indicator is used for indicating a horizontal azimuth and a vertical azimuth of the first sound source, and the horizontal azimuth is an azimuth having the first virtual object as a center, divided in a horizontal direction, e.g., longitude in the virtual world. The vertical azimuth is an azimuth divided along a vertical direction with the first virtual object as a center, for example, a pitch angle of a sound source (e.g., a first sound source) with respect to the first virtual character. In some embodiments, the vertical azimuth is represented using a vertical azimuth scale, similar to a latitude; in some embodiments, the vertical azimuth is represented by an altitude or an elevation; in some embodiments, since the virtual character has a limited movement space in the vertical direction, the vertical azimuth may be simplified or abstracted as: an upper azimuth, a middle azimuth, and a lower azimuth. In some embodiments, the vertical azimuth may be simplified or abstracted as: a higher elevation, a middle elevation, and a lower elevation.

According to some embodiments, the horizontal azimuth of the first sound source may be a first horizontal azimuth, the vertical azimuth of the first sound source may be a first vertical azimuth, the first horizontal azimuth of the first sound source may be indicated by a first azimuth scale, the first vertical azimuth of the first sound source may be represented by a first visual effect of the first sound indicator, the first visual effect may be at least one of a shape, a pattern, a color, a texture, a text, and an animation effect of the first sound indicator.

In some embodiments, a terminal may display a first sound indicator having a first visual effect based on the first azimuth scale in the azimuth scale sequence, a center of the first sound indicator is aligned with the first azimuth scale, and the first azimuth scale is used for indicating a horizontal azimuth of the first sound source and the first visual effect is used for indicating a vertical azimuth of the first sound source.

According to some embodiments, a first sound indicator is displayed only based on a first azimuth scale in compass information without a mini-map to prompt the position when there is a first sound source in the surroundings of a first virtual character, and a first horizontal azimuth and a first vertical azimuth corresponding to the first sound source may also simultaneously be indicated via the first sound indicator, so that a user may accurately determine the spatial position of the first sound source only by means of visual effect, and may also acquire sufficient and effective spatial information for a sound source in an auditory limited scene without producing sound or using headphones. In some embodiments, as shown in FIG. 3, a first sound indicator 19 is displayed based on the first azimuth scale "southwest" based on the compass information 16 when a first sound source in the surroundings of a first virtual character 10 produces a first sound. A first azimuth scale "southwest" is used for indicating that the horizontal azimuth of the first sound source is a southwest azimuth. The shape of the first sound indicator 19 is used for indicating that the vertical azimuth of the first sound source is a middle azimuth.

Figure 4:
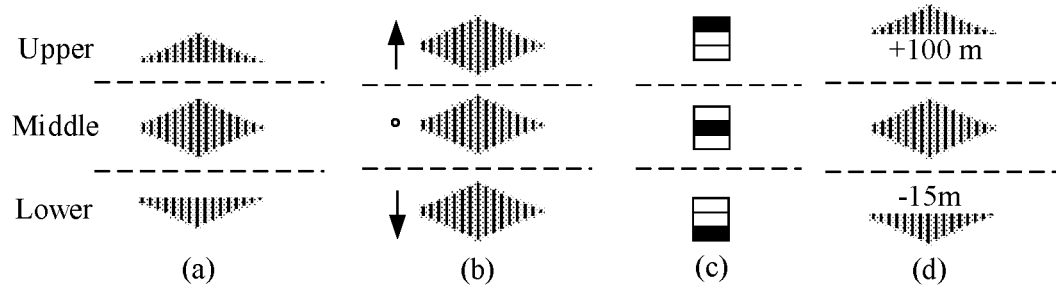
FIG. 4 is a schematic diagram showing three sound prompts in a vertical direction according to some embodiments.

For example, taking as an example that the first visual effect refers to a shape, with reference to the implementation of (a) in FIG. 4, when the shape of the first sound indicator 19 is an upper triangle, it is indicated that the first sound source is located at an upper azimuth of the first virtual character; when the first sound indicator 19 is shuttle shaped, it is indicated that the first sound source is located at a middle azimuth of the first virtual character; when the first sound indicator 19 is in a shape of a lower triangle, it is indicated that the first sound source is located at a lower azimuth of the first virtual character.

For example, taking as an example that the first visual effect refers to an arrow to the left of the first sound indicator 19, in conjunction with the implementation of (b) with reference to FIG. 4, when the arrow to the left of the first sound indicator 19 up, it is indicated that the first sound source is located at an upper azimuth of the first virtual character; when the arrow to the left of the first sound indicator 19 is circular, it is indicated that the first sound source is located at a middle azimuth of the first virtual character; when the arrow to the left of the first sound indicator 19 down, it is indicated that the first sound source is located at a lower azimuth of the first virtual character.

For example, taking as an example that the first visual effect refers to a filling color of the first sound indicator 19, in conjunction with the implementation of (c) with reference to FIG. 4, the first sound indicator 19 includes three lattices arranged longitudinally. When the uppermost lattice of the three lattices has a filling color, it is indicated that the first sound source is located at an upper azimuth of the first virtual character; when the middle lattice of the three lattices has a filling color, it is indicated that the first sound source is located at a middle azimuth of the first virtual character; when the lowest lattice of the three lattices has a filling color, it is indicated that the first sound source is located at a lower azimuth of the first virtual character.

For example, taking as an example that the first visual effect refers to the shape of the first sound indicator 19 and an additional number, in conjunction with the implementation of (d) of FIG. 4, when the shape of the first sound indicator 19 is an upper triangle and carries the number "+100 m", it is indicated that the first sound source is located at an upper azimuth of the first virtual character and has a height of 100 meters above the ground; when the first sound indicator 19 is shuttle shaped, it is indicated that the first sound source is located at a middle azimuth of the first virtual character; when the first sound indicator 19 is in a shape of a lower triangle and carries the number "−15 m", it is indicated that the first sound source is located at a lower azimuth of the first virtual character and at a height of 15 meters below the ground.

Some embodiments provide a method capable of prompting various sound information of a first sound source based on a first sound indicator near compass information without a mini-map control on a user interface. In the presence of a first sound source, there might be prompting of sound in multiples aspects based on a plurality of visual effect on a first sound indicator which occupies a very small screen area; in the absence of the first sound source, there might be as few Head Up Display (HUD) controls on the entire user interface as possible, thereby making the user interface more compact and efficient, which may provide a more immersive program use experience for the user.

Figure 5:
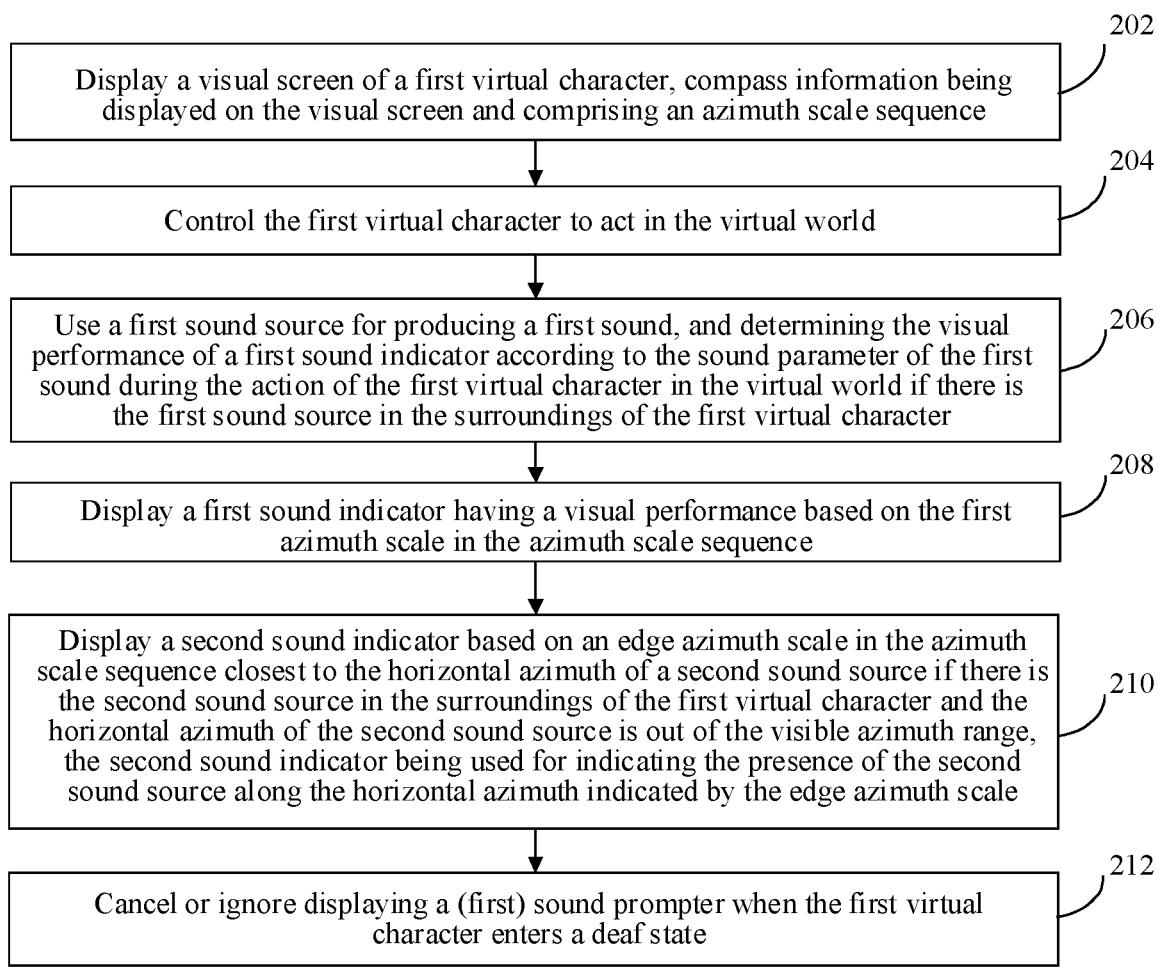
FIG. 5 is a flowchart showing a virtual world sound-prompting method according to some embodiments.

FIG. 5 is a flowchart of a virtual world sound-prompting method according to some embodiments. The method may be performed by a first terminal 120 or a second terminal 160 shown in FIG. 1, and the first terminal 120 or the second terminal 160 may be collectively referred to as a terminal, and the method includes:

Operation 202: Display a visual screen of a first virtual character, where compass information is displayed on the visual screen and includes an azimuth scale sequence;

the first virtual character is a virtual object being controlled by a first user. A visual screen of the first virtual character is a picture obtained by observing a virtual world from a perspective of the first virtual character when running an application program in a terminal. In some embodiments, the visual screen of the first virtual character is a picture obtained by observing from a first-person perspective of the first virtual character in the virtual world.

In some embodiments, the first-person perspective of the first virtual character automatically follows with the movement of the virtual character in the virtual world, i.e., the first-person perspective of the first virtual character changes with a position of the first virtual character in the virtual world, and the first-person perspective of the first virtual character is always within a preset distance range of the first virtual character in the virtual world.

The compass information includes an azimuth scale sequence, and the azimuth scales in the azimuth scale sequence are used for indicating the horizontal azimuth that the first virtual character is facing in the virtual world. In some embodiments, the azimuth scales of the respective horizontal azimuths that may be observed in the virtual world from a perspective of the first virtual character are displayed in the azimuth scale sequence, and the azimuth scales of the horizontal azimuths that cannot be observed from the current perspective may not be displayed in the azimuth scale sequence. In some embodiments, a direction scale within a preset range with a horizontal azimuth as a center directly in front of the first virtual character is displayed in the azimuth scale sequence.

In some embodiments, as shown in FIG. 3, a first virtual character 10, a moving wheel 12, a skill button 14, and compass information 16 are displayed on the visual screen. The first virtual character 10 may be a soldier located in a virtual world. The moving wheel 12 is used for controlling the movement of the first virtual character 10 in the virtual world, and the skill button 14 is used for Control the first virtual character 10 to show skills or use articles in the virtual world. The compass information 16 is displayed with an azimuth scale sequence. The azimuth scale sequence includes 7 azimuth scales: 165 degrees, south, 195 degrees, 215 degrees, southwest, 240 degrees, and 255 degrees. The azimuth scale of 215 degrees is used for indicating a horizontal azimuth directly in front of the first virtual character 10.

Operation 204: Control the first virtual character to act in the virtual world;

the user may control the first virtual character 10 to move by moving the wheel 12, or the user may control the first virtual character to show skills or use articles by pressing one or more preset skills buttons 14. The user may also control the first virtual character by a signal generated by a long press, click, double click and/or slide on the touch screen.

Operation 206: Use a first sound source for producing a first sound, and determining the visual effect of the first sound indicator according to the sound parameter of the first sound during the action of the first virtual character in the virtual world if there is the first sound source in the surroundings of the first virtual character;

the visual effect of the first sound indicator includes at least one of the following visual effects:

a first visual effect used for indicating a vertical azimuth of the first sound;

a second visual effect used for indicating a sound type of the first sound;

a third visual effect used for indicating a sound volume of the first sound;

a fourth visual effect used for indicating a sound distance of the first sound;

a fifth visual effect used for indicating the frequency of action of the first sound.

Where each visual effect is a different type of visual effect. Each visual effect is one of a shape, a pattern, a color, a texture, a text, an animation effect, a display-starting time, a display duration, and a blanking time of the first sound indicator. Different visual effects may be superimposed on the same sound indicator, and the different visual effects are used for transmitting different sound information.

The display-starting time is a time when the first sound indicator appears on the user interface. The display duration is a total duration the first sound indicator is displayed on the user interface. The blanking time is a duration the first sound indicator has been displayed on the user interface from which time the transparency starts to be reduced until disappearance.

When there is a first sound source in the surroundings of the first virtual character, the first sound source may trigger a sound event. If the first virtual character is a virtual character used by a user corresponding to the current terminal, and the first sound source is a sound source corresponding to another terminal, then that terminal synchronizes the sound event to the current terminal via a server; if the first sound source is a sound source corresponding to the current client terminal, the current terminal generates the sound event.

The sound event has sound parameters and the terminal may determine a visual effect of the first sound indicator according to a sound parameter of the first sound. The sound parameter includes, but is not limited to: at least one of a type of the first sound source, a material of the first sound source, an equipment condition of the first sound source, a position of the first sound source, a sound type of the first sound, a sound volume of the first sound, and an operation frequency of the first sound source.

In some possible cases, there are many active objects in the virtual world, many of which may produce sound as a first sound source. Even a moving object (i.e., a sound source) may produce multiple sounds. In order to facilitate accurate identification of the sound produced by the first sound source, when the first sound source produces at least two sounds and the generated time difference of the at least two sounds is less than a threshold value, the sound with the maximum sound volume among the at least two sounds is determined as the first sound.

For example, when the first virtual character is walking while firing, since the sound volume of the firing event is greater than the walking event, the firing event is determined to be a first sound event, a sound indicator of the firing event is displayed, and a sound indicator of the walking event is masked.

For example, when the first sound source produces a new sound event and the sound volume of the new sound event is greater than the sound volume of the current sound event, only the sound indicator of the new sound event is displayed. For example, the first virtual character walks in place for several operations and immediately fires, and since the sound volume of the firing event is greater than the sound volume of the walking event, the firing event is determined as a first sound event, the sound indicator of the walking event disappears, and only the sound indicator of the firing event is displayed.

According to the method provided by the embodiment, by producing at least two sounds from the first sound source and the generation time difference of the at least two sounds being less than the threshold value, the sound with the maximum sound volume among the at least two sounds is determined as the first sound, the unnecessary calculation amount of the sound event with the lower sound volume is reduced, and the accuracy of the sound effect prompt is improved.

Operation 208: Display a first sound indicator having a visual effect based on the first azimuth scale in the azimuth scale sequence;

the terminal may display a first sound indicator having at least one visual effect based on the first azimuth scale in the compass information.

The first sound indicator may be displayed at an appropriate position on the user interface according to the display position of the compass information on the user interface. For example, when the compass information is displayed above the user interface, a first sound indicator is displayed below a first azimuth scale in the compass information; when the compass information is displayed below the user interface, a first sound indicator is displayed above the first azimuth scale in the compass information. In some embodiments, the center position of the first sound indicator is aligned with the first azimuth scale, i.e., a central axis of the first sound indicator is aligned with the first azimuth scale.

In some embodiments, the visual effect of the first sound indicator may include a first visual effect used for indicating a vertical azimuth of the first sound. In one possible implementation, the visual effect of the first sound indicator may include the first visual effect along with other visual effects, i.e., the terminal may display the first sound indicator having the first visual effect and the other visual effects based on the first azimuth scale. Other visual effects include at least one of the following visual effects:

a second visual effect used for indicating a sound type of the first sound;
a third visual effect used for indicating a sound volume of the first sound;
a fourth visual effect used for indicating a sound distance of the first sound;
a fifth visual effect used for indicating the frequency of action of the first sound.

For the first visual effect:

the first visual effect includes n first visual effect corresponding to n vertical azimuths on a one-to-one basis, n being a positive integer greater than 1. The client displays an $i^{th}$ first sound indicator of the first visual effect based on the first azimuth scale in the compass information, i being a positive integer no greater than n. The $i^{th}$ first visual effect is used for indicating that the first sound source corresponds to the $i^{th}$ vertical azimuth. In some embodiments, the $i^{th}$ visual effect may include marking the first sound indicator with an altitude to correspond to the $i^{th}$ vertical azimuth of the altitude at which the first sound source is located. In some embodiments, the n vertical azimuths may include an upper azimuth, a middle azimuth, and a lower azimuth, i.e., to enable the upper, middle, and lower three levels of space to be distinguished by the first sound indicator.

The first visual effect plays a role of enabling a user to know the vertical azimuth of the first sound source by observing the visual effect of the first sound indicator, and there may be one or more ways of visually representing the vertical azimuth of the first sound source. In some embodiments, the first visual effect includes at least one of: a shape of the first sound indicator, a vertical azimuth scale in the first sound indicator, an arrow in the first sound indicator, a text prompt in the first sound indicator.

Figure 6:
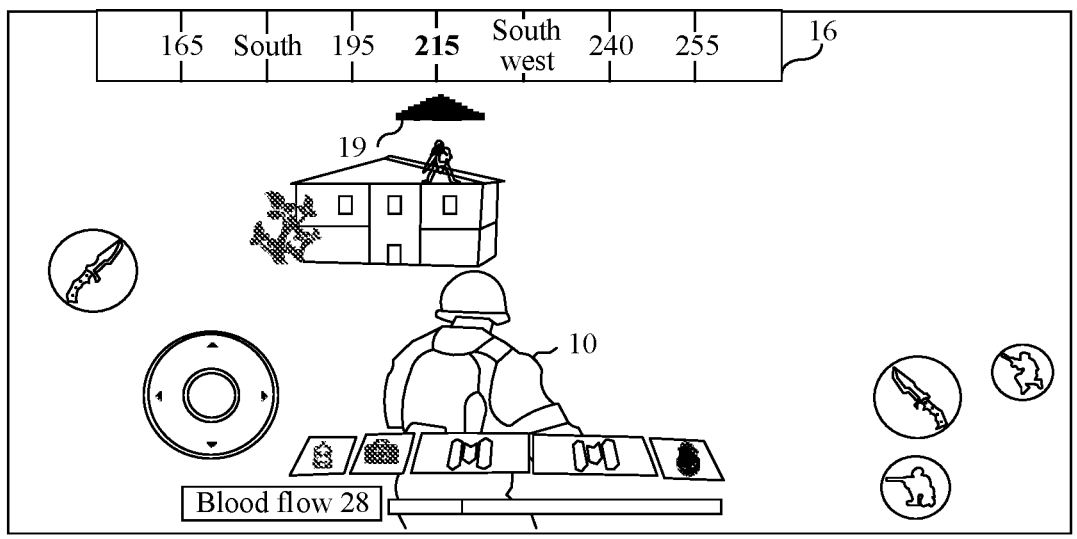
FIG. 6 is a schematic diagram showing an interface for prompting sounds above according to some embodiments.

Taking as an example that the first visual effect includes a shape, the operation includes one of:

displaying an upward-shaped first sound indicator based on the first azimuth scale in the azimuth scale sequence, the first sound indicator being used for indicating that the vertical azimuth of the first sound source is the upper azimuth;

referring to FIG. 6, assuming that the first sound source is an enemy virtual character located at the top of a building, since the height of the enemy virtual character in a vertical direction is located at an upper azimuth of the first virtual character 10, a first sound indicator having an upward shape is displayed below the first position scale "215" in the compass information 16 to indicate that the vertical azimuth of the first sound is an upper azimuth;

displaying a top-bottom symmetrical first sound indicator based on the first azimuth scale in the azimuth scale sequence, the first sound indicator being used for indicating that the vertical azimuth of the first sound source is the middle azimuth;

displaying a downward-shaped first sound indicator based on the first azimuth scale in the azimuth scale sequence, the first sound indicator being used for indicating that the vertical azimuth of the first sound source is the lower azimuth.

In contrast to FIG. 6, if the first virtual character 10 is located at the top of the building and the enemy virtual character is located on the ground below the building, the vertical azimuth of the first sound source is the lower azimuth.

Taking as an example that the first visual effect includes a vertical azimuth scale, a first sound indicator having a vertical azimuth scale for indicating a vertical azimuth of the first sound source, in some embodiments, indicating a pitch angle of the first sound source relative to the first virtual character is displayed based on the first azimuth scale in the azimuth scale sequence, i.e., the vertical azimuth scale is represented by the pitch angle of the first sound source relative to the first virtual character.

Taking as an example that the first visual effect includes an arrow, a first sound indicator having an arrow is displayed based on the first azimuth scale in the azimuth scale sequence, the arrow direction of the arrow being used for indicating the vertical azimuth of the first sound source. For example, an upward arrow indicates an upper azimuth with a greater height than a plane in which the first virtual character is located, and a downward arrow indicates a lower azimuth with a smaller height than the plane in which the first virtual character is located.

Taking as an example that the first visual effect includes a textual prompt, a first sound indicator having a textual prompt for indicating a vertical azimuth of the first sound source is displayed based on the first azimuth scale in the azimuth scale sequence.

At least two of the above shapes, vertical azimuth scales, arrows, and text prompts may also be implemented in combination as the first visual effect without limitation.

For the second visual effect:
the second visual effect is used for indicating the sound type of the first sound. In this case, determining the visual effect of the first sound indicator according to the sound parameters of the first sound may be determining the second visual effect of the first sound indicator according to the sound type of the first sound.

In some embodiments, the second visual effect includes a color of the first sound indicator, i.e., a different color of the first sound indicator is used for indicating the sound type of the first sound. For example, a footstep/NPC cry of a virtual character is represented in white, and a gunshot/explosion is represented in red.

Figure 7:
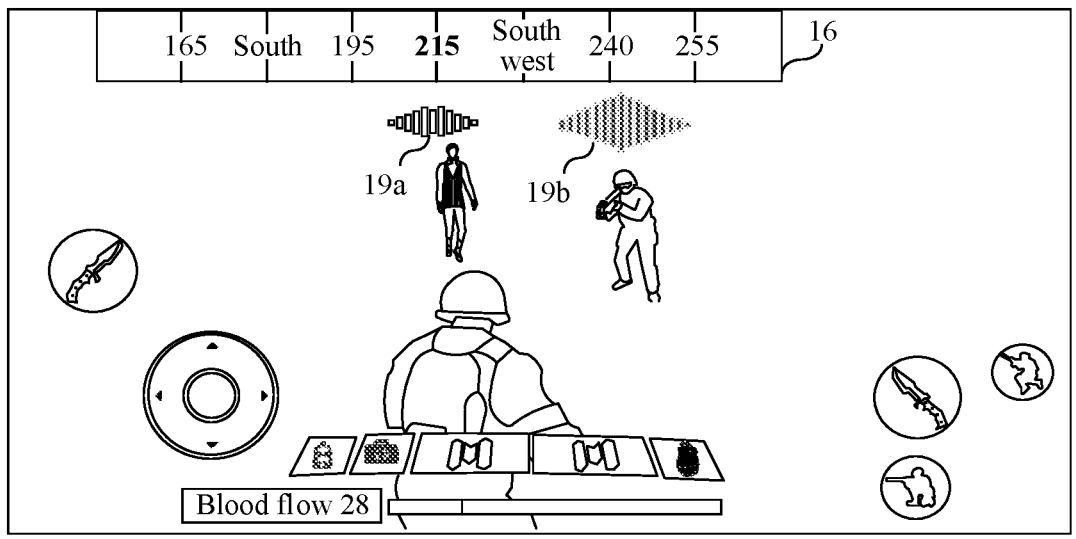
FIG. 7 is a schematic diagram showing an interface for prompting two sound types according to some embodiments.

Referring to FIG. 7, two sound indicators 19a and 19b are displayed on a user interface for two sounds from different sound sources. The sound indicator 19a is white, representing a footstep; the sound indicator 19b is red, representing a gunshot.

In some embodiments, the second visual effect includes an icon pattern of the first sound indicator, i.e., a first sound indicator of a different icon pattern is used for indicating the sound type of the first sound.

Figure 8:
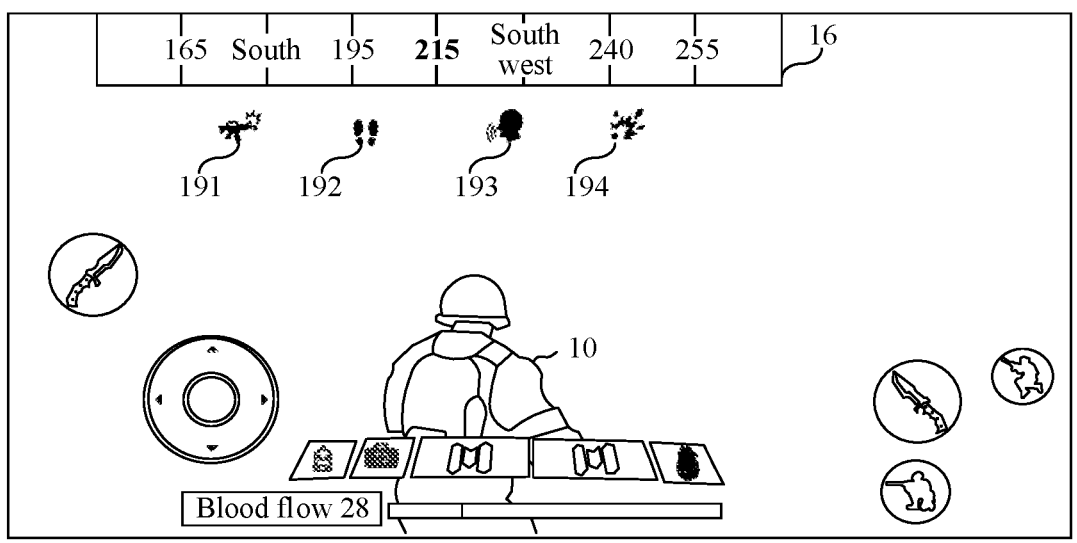
FIG. 8 is a schematic diagram showing an interface for prompting sounds with an icon pattern according to some embodiments.

Referring to FIG. 8, the sound type "gunshot" is represented using a gun icon pattern 191; a foot print icon pattern 192 is used for representing a sound type "footstep"; a human head icon pattern 193 is used for representing a sound type "human voice"; an explosion icon pattern 194 is used for representing a sound type "explosion sound".

In some embodiments, the second visual effect is a display duration of the first sound indicator. The duration of the continuous display includes: a first duration displayed by the first sound indicator in a non-transparent manner, and a second duration (i.e., blanking duration) to cancel the display by gradual changing from a non-transparent manner to a transparent manner, i.e., the sound type of the first sound is indicated with different display durations. For example, different sound types may correspond to different first durations, in some embodiments, different sound types may correspond to different second durations, or different sound types may correspond to different first and second durations.

For the third visual effect:
the third visual effect is used for indicating the sound volume of the first sound. In some embodiments, the sound volume of the first sound refers to an arriving sound volume of the first sound at the first virtual character to simulate the sound volume of the first sound heard by the first virtual character rather than the original sound volume of the first sound. In this case, the first sound indicator is represented using an acoustic amplitude spectrum, the third visual effect includes an amplitude of the first acoustic amplitude spectrum, and the sound parameter includes a sound volume; according to the sound parameter of the first sound, determining the visual effect of the first sound indicator may be determining the amplitude of the first acoustic amplitude spectrum according to an arriving sound volume of the first sound at the first virtual character.

Referring to FIG. 7, a sound indicator is represented using an acoustic amplitude spectrum, the height of which is used for representing the acoustic amplitude. Two sound indicators 19a and 19b are displayed on a user interface for two sounds from different sound sources. The acoustic amplitude of the sound indicator 19a is less than the acoustic amplitude of the sound indicator 19b, the sound volume corresponding to the sound indicator 19a is less than the sound volume corresponding to the sound indicator 19b, i.e., footsteps and gunshots by the same distance. The sound indicator 19a on the left has a smaller acoustic amplitude and the sound indicator 19b on the right has a larger acoustic amplitude.

Figure 9:
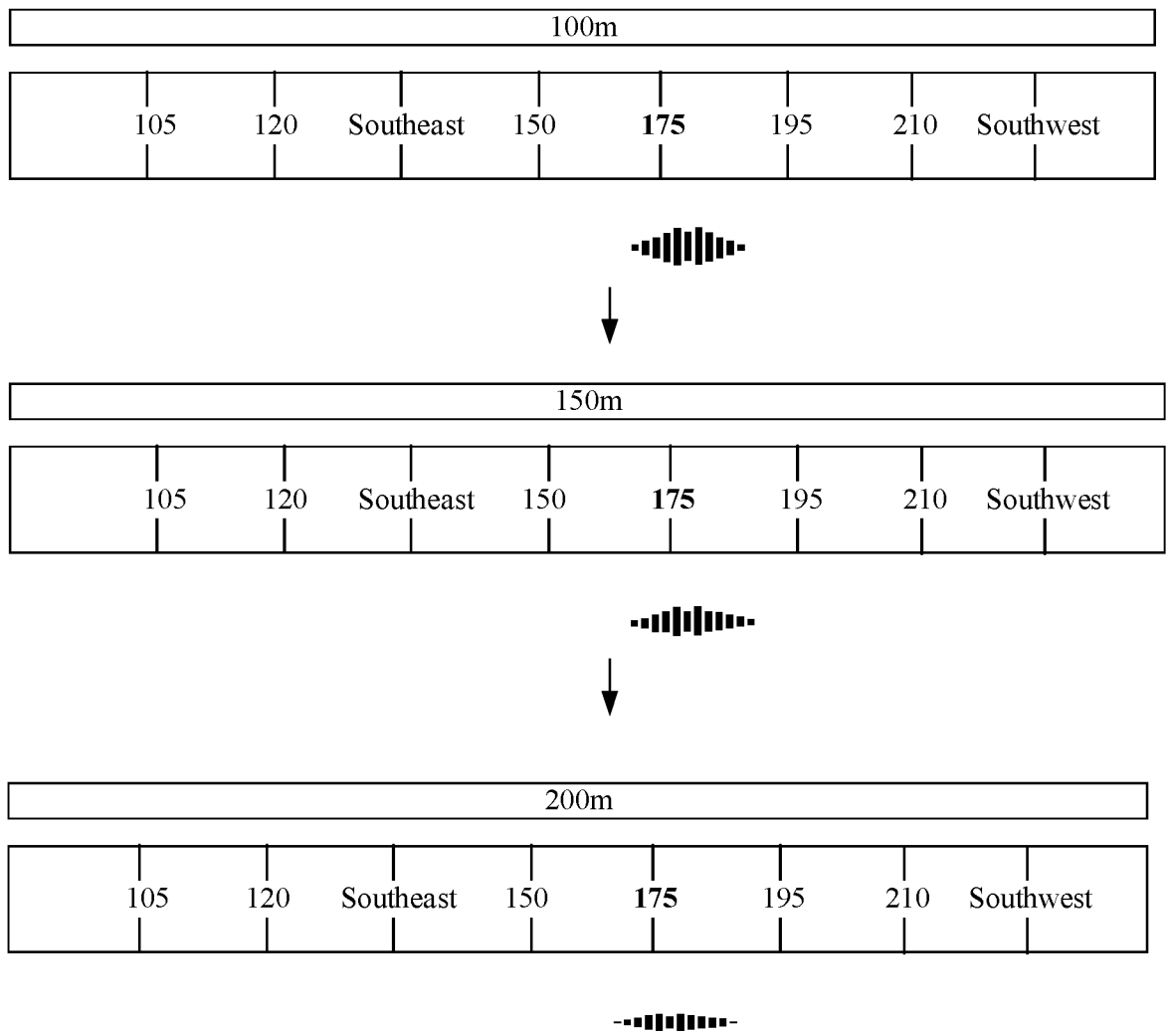
FIG. 9 is a schematic diagram showing prompting sounds at different distances according to some embodiments.

Referring to FIG. 9, a sound indicator is represented using an acoustic amplitude spectrum, the height of which is used for representing the acoustic amplitude. For two sounds of different sound volumes, different acoustic amplitudes are used for representation. FIG. 9 shows that within a distance range of 100-200 m, the amplitude of the first sound indicator weakens as the gunshots weaken with distance.

For the fourth visual effect:
the fourth visual effect is used for indicating the sound distance of the first sound. In some embodiments, the fourth visual effect is represented using the display-starting time of the first sound indicator, i.e., the first sound indicator is not displayed immediately after receiving the sound event of the first sound, but is displayed after a certain delay. The duration of the delay is related to a sound distance, which is the distance between the first sound source and the first virtual character.

For the fifth visual effect:
a fifth visual effect is used for indicating the frequency of action of the first sound. In some embodiments, the first sound indicator is represented using an acoustic amplitude spectrum, and the fifth visual effect includes a jitter frequency of the acoustic amplitude spectrum, the height of the acoustic amplitude spectrum being used for representing the acoustic amplitude, the acoustic amplitude spectrum being capable of dynamically scaling to represent the jitter of the acoustic wave. Since the amplitude of the action of generating the first sound is different, the frequency of the action of the first sound is also different. In this case, the sound parameter includes a frequency of action of the first sound source, and determining the visual effect of the first sound indicator according to the sound parameter of the first sound may be determining a jitter frequency of the acoustic amplitude spectrum from the frequency of action of the first sound source when producing the first sound.

For example, when the virtual character located at the first sound source runs, the acoustic amplitude spectrum will be displayed in white, and the jitter frequency of the acoustic amplitude spectrum will be greater to show a hurry of running. When the virtual character located at the first sound source steps down to squat away, the frequency of the jitter of the acoustic amplitude spectrum will be smaller to show the sensation of slow progress and to distinguish from running.

Operation 210: Display a second sound indicator based on an edge azimuth scale in the azimuth scale sequence closest to the horizontal azimuth of a second sound source if there is the second sound source in the surroundings of the first virtual character and the horizontal azimuth of the second sound source is out of the visible azimuth range, the second sound indicator being used for indicating the presence of the second sound source along the horizontal azimuth indicated by the edge azimuth scale;

there might also be a second sound source in the surroundings of the first virtual character, and before the second sound indicator is displayed below the azimuth scale sequence, it is determined whether a horizontal azimuth (which may also be referred to as a second horizontal azimuth) corresponding to the second sound source is within a visible azimuth range of the first virtual character.

When the horizontal azimuth to which the second sound source corresponds is within the visible azimuth range of the first virtual character, a second sound indicator is displayed based on the second azimuth scale in the azimuth scale sequence, for example the horizontal and vertical azimuths of the second sound are indicated by means of the second acoustic amplitude spectrum.

When the horizontal azimuth corresponding to the second sound source is out of the visible azimuth range of the first virtual character, a second sound indicator is displayed based on the edge azimuth scale in the azimuth scale sequence closest to the horizontal azimuth of the second sound source to indicate the presence of the second sound source or the second sound.

Figure 10:
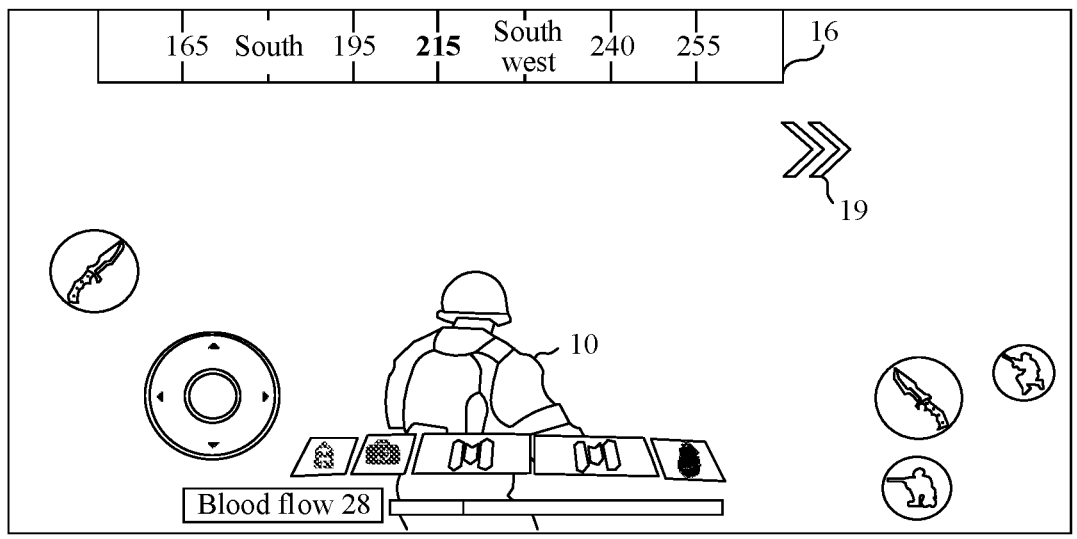
FIG. 10 is a schematic diagram showing an interface of a second sound indicator according to some embodiments.

As shown schematically in FIG. 10, within the visual range of the first virtual character 10, a second sound indicator 19 is displayed based on an edge azimuth scale on the compass information 18. The second sound indicator 19 may be aligned with or beyond the edge azimuth scale. The second sound indicator 19 is intended to indicate that there is a second sound source in the invisible area to the right of the first virtual character 10 and that the second sound source produces a second sound.

In some embodiments, the second sound indicator 19 has at least one of the five visual effects described above. The second sound indicator 19 has a visual effect category equal to or less than the first sound indicator. For example, the second sound indicator 19 only displays the sound type of the second sound using a color or icon pattern.

Operation 212: Cancel or ignore displaying a (first) sound prompter when the first virtual character enters a deaf state.

When the first virtual character is attacked by a first sound throw, the first virtual character is in a deaf state due to the received sound being too large, and the first virtual character appears as being deaf in the terminal. In the process that the first virtual character is in the deaf state, the terminal will cancel to display the first sound prompter below the azimuth scale sequence on the compass information, i.e., cancel to display all the sound prompters corresponding to the first virtual character.

The first sound throw is a mine or bomb or the like. The first virtual character may enter a deaf state when a mine explodes near the first virtual character.

In summary, according to the method provided the embodiment, a first sound indicator is displayed only based on a first azimuth scale in compass information without a mini-map to prompt the position when there is a first sound source in the surroundings of a first virtual character, and a first horizontal azimuth and a first vertical azimuth corresponding to the first sound source may also simultaneously be indicated via the first sound indicator, so that a user may accurately determine the spatial position of the first sound source only by means of visual effect, and may also acquire sufficient and effective spatial information for a sound source in an auditory limited scene without producing sound or using headphones.

According to the method provided by the embodiment, the vertical azimuth, sound type, sound volume, sound distance and frequency of action of the sound are respectively indicated through different visual effects existing on the first sound indicator at the same time, so that a user may obtain the vertical azimuth, sound type, sound volume, sound distance and frequency of action of the first sound only by using different visual effect, and may also obtain effective information about the first sound in a hearing-limited scene without external sound or using headphones. At the same time, since the first sound indicator occupies a very small area on the user interface, display space on the user interface may be saved. In addition, in the absence of a mini-map to prompt the location, merely multi-faceting the sound based on multiple visual effect of the first sound indicator of the compass may provide the user with a more immersive gaming experience.

The method provided also improves the accuracy with which the user may determine the spatial position of the first sound source by means of the visual effect only, by canceling or ignoring the display of the (first) sound prompters in case the first virtual character enters the deaf state.

For the five visual effects described above, the above operation 205 may in some embodiments further include at least one of the following operations:

for the first visual effect:

a pitch angle of the first sound source with respect to the first virtual character is calculated according to a position of the first sound source and the first virtual character in the virtual environment; the vertical azimuth of the first sound source is determined based on the range of the pitch angle.

Figure 11:
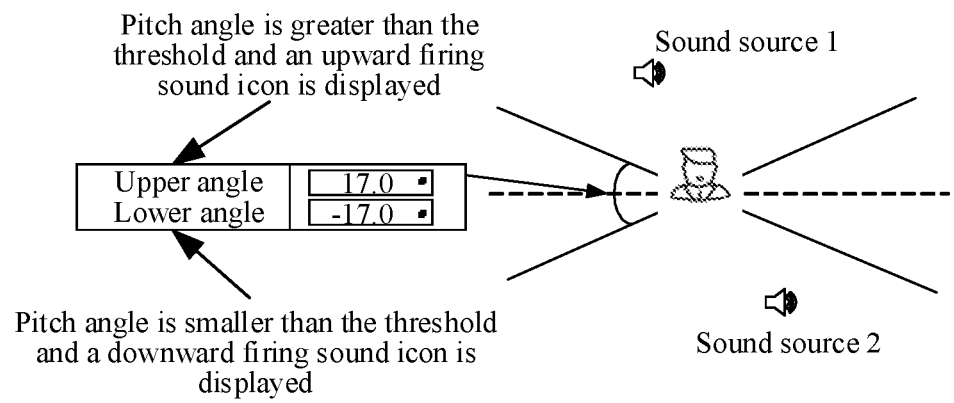
FIG. 11 is a schematic diagram showing a vertical direction sound confirmation according to some embodiments.

In some embodiments, as shown in FIG. 11, a pitch angle is used for determining a vertical azimuth of the first sound source, where the pitch angle of the first sound source with respect to the first virtual character is in a range of −17° to 17° or 163° to 180° or −163° to −180°, and the vertical range of the first sound source is determined to be a middle azimuth with respect to the first virtual character; a vertical azimuth of the first sound source is determined to be an upper azimuth with respect to the first virtual character when a pitch angle of the first sound source with respect to the first virtual character is in a range of 17° to 163°; the vertical azimuth of the first sound source is determined to be a lower azimuth relative to the first virtual character when the pitch angle of the first sound source relative to the first virtual character is in a range of −17° to −163°.

For the second visual effect:

when the second visual effect includes the color of the first sound indicator, the color of the first sound indicator is determined according to the sound type of the first sound.

In some embodiments, as shown in Table one, a first correspondence between sound types and colors is shown.

TABLE I

| Color | Sound type |
|---|---|
| White | Footstep |
| Red | Gunshot |
| Orange | Explosion sound |
| Blue | Cries |

By querying the first correspondence, the terminal may determine a color corresponding to the sound type of the first sound and determine the color as the color of the first sound indicator.

When the second visual effect includes the icon pattern of the first sound indicator, the icon pattern of the first sound indicator is determined according to the sound type of the first sound.

In some embodiments, as shown in Table two, a second correspondence between sound types and icon patterns is shown.

TABLE II

| Icon pattern | Sound type |
|---|---|
| Footprint icon pattern | Footstep |
| Gun icon pattern | Gunshot |
| Flame icon pattern | Explosion sound |
| Human head icon pattern | Cries |

By querying the second correspondence, the terminal may determine an icon pattern corresponding to the sound type of the first sound and determine the icon pattern as the icon pattern of the first sound indicator.

For the third visual effect:
when the first sound indicator is represented using an acoustic amplitude spectrum and the third visual effect includes the magnitude of the first acoustic amplitude spectrum:

Operation 1: Determine an arriving sound volume of the first sound according to an original sound volume of the first sound and an influence parameter, the influence parameter including at least one of the following parameters:

a distance between the first sound source and the first virtual character;

the sound volume is attenuated by propagation with distance. Therefore, the longer the distance between the first sound source and the first virtual character is, the smaller the sound volume of the first sound is; the shorter the distance between the first sound source and the first virtual character is, the larger the sound volume of the first sound is.

Equipment worn by the first virtual character;

The equipment worn by the first virtual character relating to the sound volume includes: at least one of different types of helmets and headphones. Both the type of equipment and the wearing of the equipment affect the sound volume of the first sound.

In some embodiments, for the sound volume of the same original sound, the arriving sound volume determined when the first virtual character is wearing an earphone is larger than the arriving sound volume determined when the first virtual character is not wearing the earphone; and the arriving sound volume determined when the first virtual character is wearing a helmet is smaller than the arriving sound volume determined when the first virtual character is not wearing the helmet.

When the first sound source is a second virtual character, the equipment worn by the second virtual character;

The equipment worn by the second virtual character relating to the sound volume includes: at least one of different types of guns, different ammunition types, and mufflers. Both the type of equipment and the wearing of the equipment affect the sound volume of the first sound.

In some embodiments, for the sound volume of the same original sound, the arriving sound volume determined when the second virtual character is wearing a muffler is smaller than the arriving sound volume determined when the second virtual character is not wearing a muffler.

The material of the first sound source or the material to which the first sound source is exposed.

For example, the sound of a first virtual character's shoes touching different floors may affect the sound volume, and the sound of a first virtual character's shoes of different materials touching the same floors may affect the sound volume.

In some embodiments, the arriving sound volume=(original sound volume*influence coefficient of original sound volume)*(1−sound distance/(maximum effective distance of sound*influence coefficient of maximum distance)).

Here, the original sound volume is the sound volume produced by the first sound at the first sound source. In some embodiments, the influence coefficient of the original sound volume is related to the above-mentioned influence parameters and is usually set as an empirical value by the designer. The influence coefficient at the maximum distance of the sound is used for indicating the sound attenuation characteristics and is related to the above-mentioned influence parameters and is usually set to an empirical value by the designer.

For example, assuming that the first virtual character carries a sound-insulating helmet and hears a gunshot of a muffler 75 m away with an original sound volume of 100 m and a maximum effective distance of 150 m. The influence coefficient of the muffler on the original sound volume is 1, and the influence coefficient of the muffler on the maximum distance is 0.5; the helmet has an influence coefficient for the original sound volume of 0.5 and an influence coefficient for the maximum distance of 0.5.

The arriving sound volume=(100*1*0.5)*(1−75/(150*0.5*0.5))=50*−1=−50=negative return to zero=no sound is heard, so no ripple is displayed on the first sound indicator.

In some embodiments, assuming that the first virtual character carries a sound-insulating helmet and hears a gunshot of a muffler 30 m away with an original sound volume of 100 m and a maximum effective distance of 150 m.

The arriving sound volume=(100*0.5)*(1−30/(150*0.5*0.5))=50*0.2=25.

Operation 2: Determine an amplitude of the first acoustic amplitude spectrum according to an arriving sound volume of the first sound at the first virtual character.

The client maps the arriving sound volume of the first sound to the sound volume of the first acoustic amplitude spectrum through a "sound volume-ripple amplitude" conversion curve.

For example, a rifle firing sound at 150 m from the player is 100*(1−150/200)=25, and the value 25 is converted into an acoustic amplitude of 0.22 via a conversion curve, and the acoustic amplitude of the first acoustic amplitude spectrum is influenced at a magnification of 0.22.

For the fourth visual effect:
when the fourth visual effect includes a display-starting time of the first sound indicator, the display-starting time of the first sound indicator is determined based on a sound propagation speed between the first sound source and the first virtual character, the display-starting time being later than a generation time of the first sound.

In some embodiments, display-starting time=generation time of the first sound+sound distance/sound propagation speed in the virtual environment;

the first sound generation time is the time when the first sound is produced by the first sound source, the sound distance is the distance between the first sound source and the first virtual character, and the sound propagation speed in the virtual environment is usually set as an empirical value by a designer.

For the fifth visual effect:
The first sound indicator is represented using an acoustic amplitude spectrum, the fifth visual effect includes a jitter frequency of the acoustic amplitude spectrum, and the jitter frequency of the acoustic amplitude spectrum is determined according to a frequency of action when the first sound is produced by the first sound source.

In some embodiments, when the virtual character located at the first sound source runs, the acoustic amplitude spectrum will be displayed in white, and the jitter frequency of the acoustic amplitude spectrum will be greater to show a hurry of running. When the first virtual character steps down to squat away, the jitter frequency of the acoustic amplitude spectrum will be smaller to show the sensation of slow progress and to distinguish from running.

The sequence of the above-mentioned calculation processes is not defined or limited herein.

In some embodiments, a developer may configure the tactical prop, equipment referred to in the above embodiments, to have an arriving sound volume influence coefficient of the first sound. Referring to FIG. 12, a configuration interface 1200 of a headphone's arriving sound volume influence coefficient for a first sound is shown. The configuration interface 1200 includes three configuration items, i.e., an increased acoustic amplitude coefficient 1201, a sound volume influence coefficient 1202 and an influence coefficient at the maximum distance of the sound 1203, where the increased acoustic amplitude coefficient 1201 configuration item is used for configuring the influence coefficient of the acoustic amplitude of the first sound when the first virtual character is wearing a headphone, and the sound volume influence coefficient 1202 configuration item is used for configuring the influence coefficient of the arriving sound volume of the first sound when the first virtual character wears the headphone; the influence coefficient at the maximum distance of the sound 1203 configuration item is used for configuring the influence coefficient for the maximum distance the first sound may travel when the first virtual character is wearing the headphone. In some embodiments, both the sound volume influence coefficient 1202 and the influence coefficient at the maximum distance of the sound 1203 configuration items are 1, having no influence on the arriving sound volume and the first sound maximum distance of the first sound when the first virtual character is wearing a headphone.

FIG. 13 shows a configuration interface 1300 of the muffler's arriving sound volume influence coefficient for the first sound. The configuration interface 1300 includes two configuration items, including a muffler sound volume influence coefficient 1301 and a influence coefficient at the maximum distance of the sound 1302 of the muffler, where the muffler sound volume influence coefficient 1301 configuration item is used for configuring the arriving sound volume influence coefficient of the first sound when the first virtual character is wearing a muffler, and the influence coefficient at the maximum distance of the sound 1302 of the muffler configuration item is used for configuring the influence coefficient for the maximum distance that the first sound may propagate when the first virtual character is wearing the muffler. In some embodiments, the muffler sound volume influence coefficient 1301 is 1 and has no influence on the arriving sound volume of the first sound when the first virtual character is wearing a muffler.

FIG. 14 shows a configuration interface 1400 of the tread material's arriving sound volume influence coefficient for the first sound. The configuration interface 1400 includes two configuration items for the marble metal material 1410, a sound volume influence coefficient 1401 and an influence coefficient at the maximum distance of the sound 1402, where the sound volume influence coefficient 1401 configuration item is used for configuring the arriving sound volume influence coefficient of the first sound when the first virtual character steps on the ground of the marble metal material, and the influence coefficient at the maximum distance of the sound 1402 configuration item is used for configuring the influence coefficient for the maximum distance that the first sound may propagate when the first virtual character steps on the ground of the marble metal material. In some embodiments, the sound volume influence coefficient 1401 and the influence coefficient at the maximum distance of the sound 1402 are both 1, and have no influence on the arriving sound volume and the first sound maximum distance of the first sound when the first virtual character steps on the ground of the marble metal material.

Figure 15:
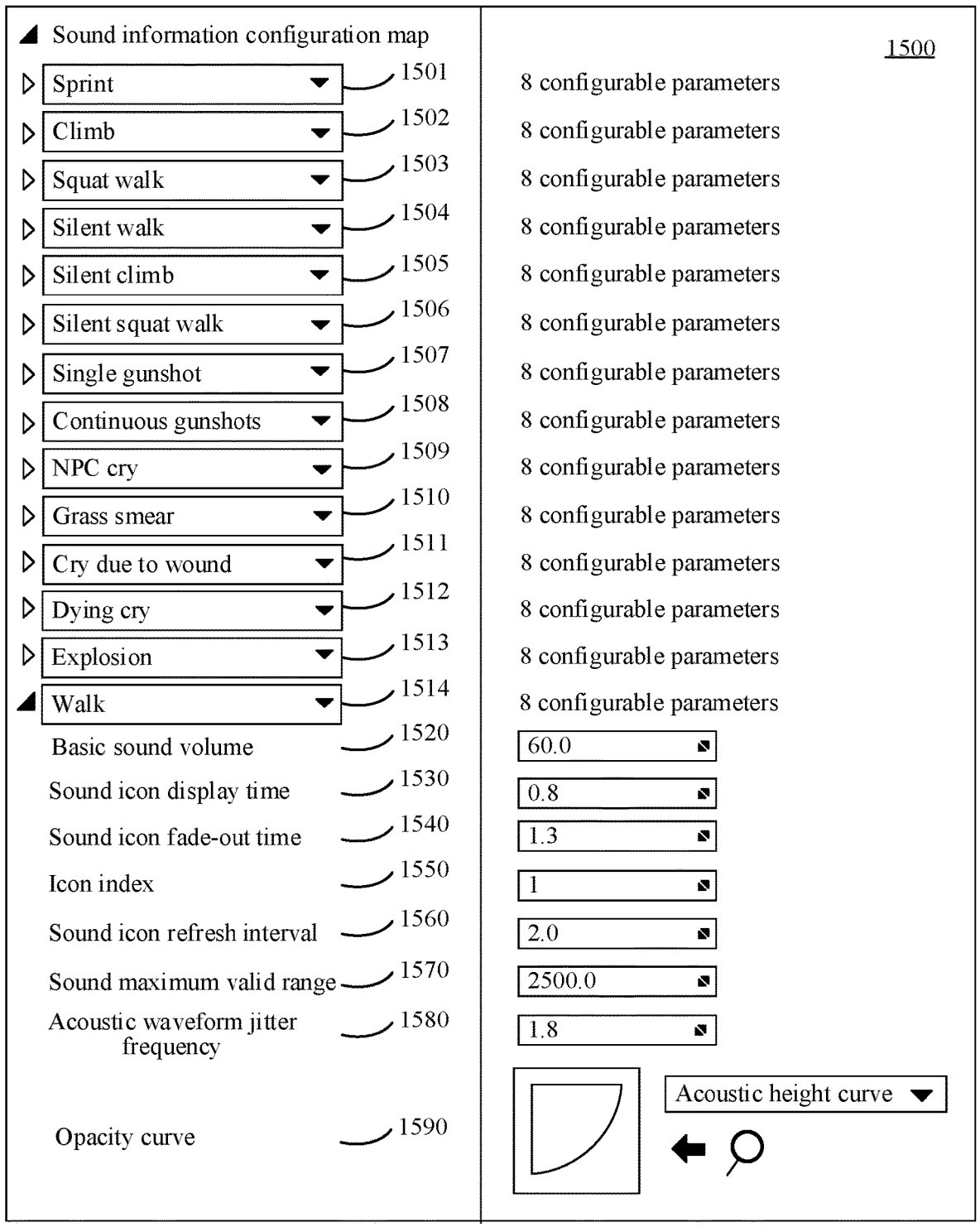
FIG. 15 is a configuration diagram showing different sound type influence coefficients according to some embodiments.

In some embodiments, the developer may configure the influence coefficient of the different sound types mentioned in the above embodiments on the first sound. Referring to FIG. 15, a configuration interface 1500 for different sound types and basic configuration parameters is shown. The configuration interface 1500 includes eight configurable parameters including sprint 1501, climb 1502, squat walk 1503, silent walk 1504, silent climb 1505, silent squat walk 1506, single gunshot 1507, continuous gunshots 1508, NPC cry 1509, grass smear 1510, cry due to wound 1511, dying cry 1512, explosion 1513 and walk 1514, where the different sound types include a basic sound volume 1520, a sound icon display time 1530, a sound icon fade-out time 1540, an icon index 1550, a sound icon refresh interval 1560, a sound maximum valid range 1570, an acoustic waveform jitter frequency 1580 and an opacity curve 1590.

Figure 16:
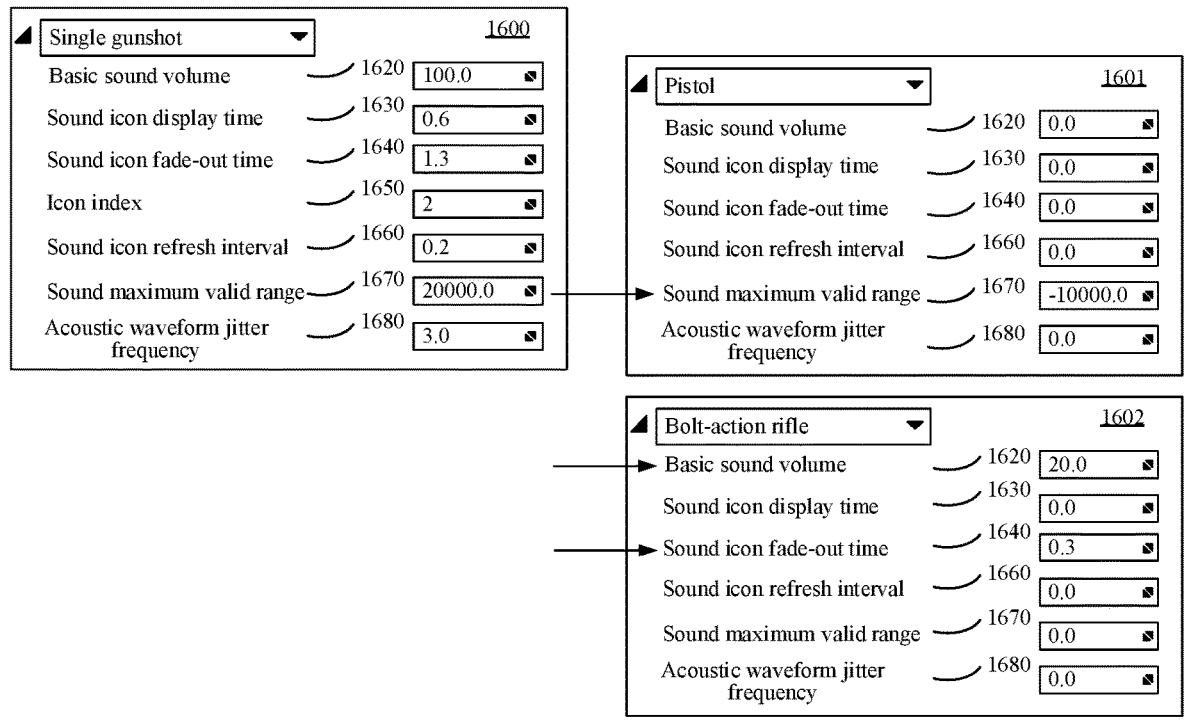
FIG. 16 is a configuration diagram showing various gun type parameters according to some embodiments.

In some embodiments, a developer may configure configuration parameters corresponding to the different firearm types mentioned in the embodiments above. Referring to FIG. 16, a configuration interface 1600 for configuration parameters corresponding to different gun types is shown, which may be varied in addition or subtraction based on gunshot types. The configuration interface includes a configuration interface 1600 for single gunshot basis parameters, a parameter configuration interface 1601 for a pistol and a parameter configuration interface 1602 for a bolt-action rifle on a single gunshot basis. The configuration interface for a single gunshot includes a basic sound volume 1620, a sound icon display time 1630, a sound icon fade-out time 1640, an icon index 1650, a sound icon refresh interval 1660, a sound maximum valid range 1670, and an acoustic waveform jitter frequency 1680. The configuration item of the configuration interface sound maximum valid range 1670 of the pistol is 100 meters, which is 100 meters less than the configuration item 200 meters of the sound maximum valid range 1670 for a single gunshot, the configuration item of the sound maximum valid range 1670 for pistol is 100 meters, and the basic sound volume 1620, the sound icon display time 1630, the sound icon fade-out time 1640, the sound icon refresh interval 1660 and the acoustic waveform jitter frequency 1680 are the same as those for a single gunshot. The configuration item of the configuration interface basic sound volume 1620 of the bolt-action rifle is 20, the configuration item of the sound icon fade-out time 1640 is 0.3, the configuration item of the bolt-action rifle is 20 larger than the basic sound volume 1620 of the single gunshot, the configuration item of the sound icon fade-out time 1640 is 0.3; the sound maximum valid range 1670 of the bolt-action rifle, the sound icon display time 1630, the sound icon refresh interval 1660, and the acoustic waveform jitter frequency 1680 are the same as those for the single gunshot.

Figure 17:
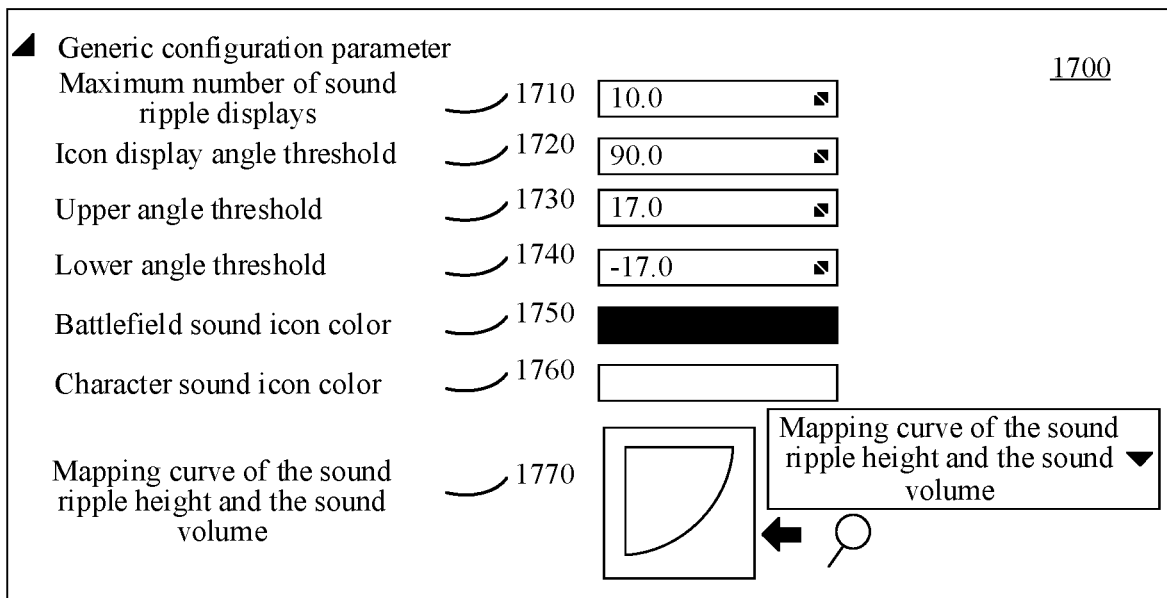
FIG. 17 is a configuration diagram showing general configuration parameters for prompting sounds according to some embodiments.

In some embodiments, a developer may configure the generic configuration parameters mentioned in the above embodiments. Referring to FIG. 17, a configuration interface 1700 for general configuration parameters is shown that includes a maximum number of sound ripple displays 1710, an Icon display angle threshold 1720, an upper angle threshold 1730, a lower angle threshold 1740, a battlefield sound icon color 1750, a character sound icon color 1760, and a mapping curve 1770 of the sound ripple height and the sound volume. The configuration item of the Icon display angle threshold 1720 is 90°, and a sound icon of a valid sound source within the coverage range of a left-right rotation of 90° of the first virtual character camera shooting is displayed by default; a mapping curve 1770 of the sound ripple height and the sound volume may convert the arriving sound volume of the first sound into a mapping curve of the first sound, where a horizontal axis represents the sound intensity and a numerical axis represents the waveform height. In summary, according to the method provided the embodiment, a first sound indicator is displayed based on a first azimuth scale in an azimuth scale sequence without a mini-map to prompt the position when there is a first sound source in the surroundings of a first virtual character, and a first horizontal azimuth and a first vertical azimuth corresponding to the first sound source may also simultaneously be indicated via the first sound indicator, so that a user may accurately determine the spatial position of the first sound source only by means of visual effect, and may also acquire sufficient and effective spatial information for a sound source in an auditory limited scene without producing sound or using headphones.

According to the method according to the embodiment, the attribute of the first sound source may be further distinguished according to the amplitude, jitter frequency and duration of the acoustic amplitude spectrum of the sound indicator and the acoustic wave below the sound indicator; the vertical azimuth of the first sound source in the virtual world is determined according to the comparison between the sound source angle and the pitch angle improves the prompting effect on the sound volume, sound frequency and sound type.

Figure 18:
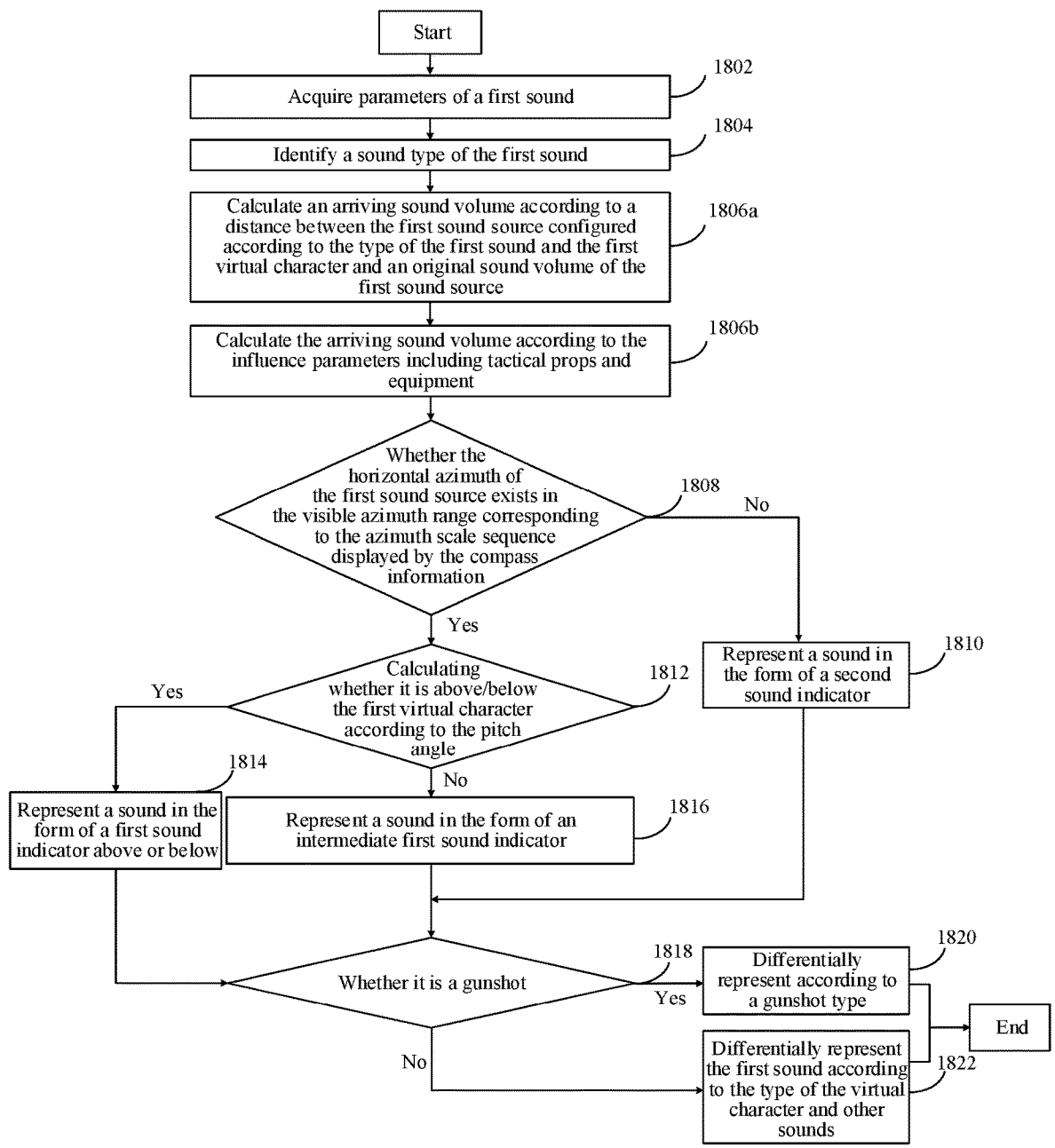
FIG. 18 is a flowchart showing a virtual world sound-prompting method according to some embodiments.

FIG. 18 is a flowchart of a virtual world sound-prompting method according to some embodiments. The method may be performed by a first terminal 120 or a second terminal 160 shown in FIG. 1, and the first terminal 120 or the second terminal 160 may be collectively referred to as a terminal, and the method includes:

Operation 1802: Acquire parameters of a first sound;
where the terminal obtains parameters of a first sound produced by the first sound source. In some embodiments, the terminal acquires the parameters of the sound event of the first sound produced by the first sound source.

Operation 1804: Identify a sound type of the first sound;
where a sound type of the first sound is determined according to sound parameters of the first sound acquired by the terminal, and a corresponding second visual effect carried by the first sound indicator is determined according to different sound types.

In some embodiments, the second visual effect is a color, and it is determined that the first sound is a foot/NPC cry of the virtual character according to the sound parameter of the first sound acquired by the terminal, then white is used for representing the first sound indicator; if it is determined that the first sound is a gunshot/explosion sound, red is used for representing the first sound indicator.

In some embodiments, the second visual effect is an icon pattern, the type of the first sound is determined according to sound parameters of the first sound acquired by the terminal, and a different icon pattern corresponding to the first sound is used for representing the first sound indicator. For example, when it is determined that the first sound is a footstep sound of the virtual character, the first sound indicator is represented by a foot print icon pattern; if it is determined that the first sound is a gunshot, the first sound indicator is represented using a gun icon pattern.

Operation 1806a: Calculate an arriving sound volume according to a distance between the first sound source configured according to the type of the first sound and the first virtual character and an original sound volume of the first sound source;
the sound event of the first sound carries the three-dimensional coordinates of the first sound source. The terminal may calculate a distance between the first sound source and the first virtual character by calculating the distance between the three-dimensional coordinates of the first sound source and the three-dimensional coordinates of the first virtual character.

Since the sound volume will be attenuated with the distance propagation, the longer the distance between the first sound source and the first virtual character is, the smaller the sound volume of the first sound is; the shorter the distance between the first sound source and the first virtual character is, the larger the sound volume of the first sound is.

The sound event of the first sound also carries the original sound volume of the first sound source, and the terminal attenuates the original sound volume of the first sound by using the distance as an influence parameter.

Operation 1806b: Calculate the arriving sound volume according to the influence parameters including tactical props and equipment; and
the terminal also determines a corresponding influence coefficient according to the influence parameters such as tactical props and equipment, and then calculates the final arriving sound volume of the first sound.

In some embodiments, tactical props and equipment (which may be collectively referred to as equipment) include:
Equipment worn by the first virtual character;
The equipment worn by the first virtual character relating to the sound volume includes: at least one of different types of helmets and headphones. Both the type of equipment and the wearing of the equipment affect the sound volume of the first sound.

When the first sound source is a second virtual character, the equipment worn by the second virtual character;

The equipment worn by the second virtual character relating to the sound volume includes: at least one of different types of guns, different ammunition types, and mufflers. Both the type of equipment and the wearing of the equipment affect the sound volume of the first sound.

The material of the first sound source or the material to which the first sound source is exposed.

For example, the sound of a first virtual character's shoes touching different floors may affect the sound volume, and the sound of a first virtual character's shoes of different materials touching the same floors may affect the sound volume.

In some embodiments, the arriving sound volume=(original sound volume*influence coefficient of original sound volume)*(1−sound distance/(maximum effective distance of sound*influence coefficient of maximum distance)).

Here, the original sound volume is the sound volume produced by the first sound at the first sound source. In some embodiments, the influence coefficient of the original sound volume is related to the above-mentioned influence parameters and is usually set as an empirical value by the designer. The influence coefficient at the maximum distance of the sound is used for indicating the sound attenuation characteristics and is related to the above-mentioned influence parameters and is usually set to an empirical value by the designer.

For example, assuming that the first virtual character carries a sound-insulating helmet and hears a gunshot of a muffler 75 m away with an original sound volume of 100 m and a maximum effective distance of 150 m. The influence coefficient of the muffler on the original sound volume is 1, and the influence coefficient of the muffler on the maximum distance is 0.5; the helmet has an influence coefficient for the original sound volume of 0.5 and an influence coefficient for the maximum distance of 0.5.

The arriving sound volume=(100*1*0.5)*(1−75/(150*0.5*0.5))=50*−1=−50=negative return to zero=no sound is heard, so no ripple is displayed on the first sound indicator.

In some embodiments, assuming that the first virtual character carries a sound-insulating helmet and hears a gunshot of a muffler 30 m away with an original sound volume of 100 m and a maximum effective distance of 150 m.

The arriving sound volume=(100*0.5)*(1−30/(150*0.5*0.5))=50*0.2=25.

Operation 1806a and operation 1806b may be calculated simultaneously, or the sound volume before being influenced by the tactical prop and the equipment may be calculated as an intermediate value according to the distance between the first sound source and the first virtual character and the original sound volume of the first sound source, and then the final arriving sound volume after being influenced by the tactical prop and the equipment may be calculated.

Operation 1808: Determine whether the horizontal azimuth of the first sound source is within the visible azimuth range corresponding to the azimuth scale sequence displayed by the compass information;

The compass information includes an azimuth scale sequence, and the azimuth scales in the azimuth scale sequence are used for indicating the horizontal azimuth that the first virtual character is facing in the virtual world. In some embodiments, the azimuth scales of the respective horizontal azimuths that may be observed in the virtual world from a perspective of the first virtual character are displayed in the azimuth scale sequence, and the azimuth scales of the horizontal azimuths that cannot be observed from the current perspective may not be displayed in the azimuth scale sequence. In some embodiments, a direction scale within a preset range with a horizontal azimuth as a center directly in front of the first virtual character is displayed in the azimuth scale sequence.

If the horizontal azimuth of the first sound source is not within the visible azimuth range corresponding to the azimuth scale sequence displayed by the compass information, operation 1810 is performed to represent a sound in the form of a second sound indicator; if the horizontal azimuth of the first sound source is within the visible azimuth range corresponding to the azimuth scale sequence displayed by the compass information, operation 1812 is performed to calculate whether it is above/below the first virtual character according to the pitch angle.

Operation 1810: Represent a sound in the form of a second sound indicator; and displaying a second sound indicator based on the edge azimuth scale of the azimuth scale sequence closest to the second horizontal azimuth, determining the sound as a second sound or a second sound source, and indicating by the second sound indicator if it is determined that the horizontal azimuth of the first sound source is not within the visible azimuth range corresponding to the azimuth scale sequence displayed by the compass information.

Operation 1812: Determine whether the first sound source is above/below the first virtual character through calculation of a pitch angle;

calculating a pitch angle of the first sound source with respect to the first virtual character according to the position coordinates of the first sound source and the first virtual character acquired by the terminal in the virtual environment; and the vertical azimuth of the first sound source is determined based on the range of the pitch angle.

When the first sound source is above/below the first virtual character, operation 1814 is executed, and sound is represented in the form of an upper or lower first sound indicator, i.e., when the first sound source is above the first virtual character, upper information is represented in the form of displaying an upper first sound indicator; lower information is represented in the form of displaying a lower first sound indicator when the first sound source is below the first virtual character; when the first sound source is not above/below the first virtual character, operation 1816 is performed to represent sound in the form of an intermediate first sound indicator, i.e., the first sound source is in the middle of the first virtual character, and the intermediate information is represented in the form of displaying an intermediate first sound indicator.

In some embodiments, as shown in FIG. 11, the first character is determined to be in the middle of the first virtual character when the pitch angle of the first sound source with respect to the first virtual character is in a range of −17° to 17° or 163° to 180° or −163° to −180°; the first character is determined to be above the first virtual character when a pitch angle of the first sound source with respect to the first virtual character is in a range of 17° to 163°; the first character is determined to be below the first virtual character when the pitch angle of the first sound source with respect to the first virtual character is in a range of −17° to −163°.

Operation 1814: Represent a sound in the form of a first sound indicator above or below;

Operation 1816: Represent a sound in the form of an intermediate first sound indicator;

Operation 1818: Determine whether the first sound is a gunshot;

Determine whether the first sound is a gunshot according to a sound parameter of the first sound acquired by the terminal, and in a case of being a gunshot, performing operation 1820 to differentially represent the first sound according to a gunshot type; when it is determined that the first sound is not a gunshot, performing operation 1822 to differentially represent the first sound according to the character and other sound types.

Operation 1820: Differentially represent the first sound according to a gunshot type;

where an exemplary terminal determines that the first sound is a gunshot according to a sound parameter of the first sound, recognizes the first sound indicator of the first sound as red or as an icon pattern of a shooter, and determines an acoustic amplitude, an acoustic wave vibration frequency and an acoustic wave duration of the first sound indicator according to the first sound parameter.

Operation 1822: Differentially represent the first sound according to the type of the virtual character and other sounds.

An exemplary terminal determines that the first sound source is a virtual character according to the sound parameters of the first sound, recognizes the first sound indicator of the first sound as white or as a foot print icon pattern or a human head icon pattern, and then determines the acoustic amplitude, the acoustic wave vibration frequency, and the acoustic wave duration of the first sound indicator according to the first sound parameters.

In summary, according to the method provided by the embodiment, a type of a first sound is identified by a terminal acquiring a sound parameter of the first sound; an arriving sound volume of the first sound is calculated according to a distance between a first sound source and a first virtual character and an original sound volume of the first sound source; and a horizontal azimuth and a vertical azimuth of the first sound is determined by determining whether the first sound is in an azimuth scale range displayed by the compass information, thereby improving a prompt effect on sound volume, sound frequency and sound type.

Figure 19:
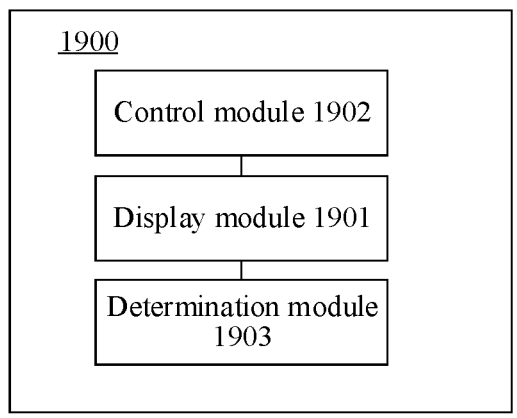
FIG. 19 is a structural block diagram showing a terminal according to some embodiments.

FIG. 19 is a schematic diagram illustrating a structure of a virtual world sound-prompting apparatus according to some embodiments. The apparatus may be implemented in software, hardware, or a combination of both as all or part of a computer device, the apparatus 1900 including:

a display module 1901 configured to display a visual screen of a first virtual character, compass information being displayed on the visual screen and azimuth scale in the azimuth scale sequence being used for including an azimuth scale sequence, an azimuth scale in the azimuth scale sequence being used for indicating a horizontal azimuth that the first virtual character faces in a virtual world;

a control module 1902 configured to control the first virtual character to act in the virtual world, the display module 1901 being configured to display a first sound indicator based on a first azimuth scale in the azimuth scale sequence if there is a first sound source in the surroundings of the first virtual character during the action of the first virtual character in the virtual world, the first sound indicator being used for indicating a horizontal azimuth and a vertical azimuth corresponding to the first sound source.

According to some embodiments, the display module 1901 is configured to display a first sound indicator having a visual effect based on the first azimuth scale in the azimuth scale sequence, where a central position of the first sound indicator is aligned with the first azimuth scale used for indicating a horizontal azimuth of the first sound source, and the visual effect of the first sound indicator is used for indicating a vertical azimuth of the first sound source.

According to some embodiments, the visual effect of the first sound indicator includes a first visual effect used for indicating a vertical azimuth of the first sound source, and the first visual effect includes at least one of: a shape of the first sound indicator; a vertical azimuth scale in the first sound indicator; an arrow in the first sound indicator; a text prompt in the first sound indicator.

According to some embodiments, the first visual effect includes: n first visual effect corresponding to n vertical azimuths on a one-to-one basis, n being a positive integer greater than 1;

the display module 1901 is configured to display a first sound indicator having an $i^{th}$ first visual effect based on the first azimuth scale in the compass information, the $i^{th}$ first visual effect is used for indicating that the first sound source corresponds to an $i^{th}$ vertical azimuth, i being a positive integer not greater than n.

According to some embodiments, the vertical azimuth includes: an upper azimuth, a middle azimuth, and a lower azimuth.

The display module 1901 is configured to display an upward-shaped first sound indicator based on the first azimuth scale in the azimuth scale sequence, the first sound indicator being used for indicating that the vertical azimuth of the first sound source is the upper azimuth. In some embodiments, display module 1901 is configured to display an upward-tapered first sound indicator based on the first azimuth scale in the azimuth scale sequence. In some embodiments, the display module is configured to display a top-bottom symmetrical first sound indicator based on the first azimuth scale in the azimuth scale sequence, the first sound indicator being used for indicating that the vertical azimuth of the first sound source is the middle azimuth. In some embodiments, the display module is configured to display a downward-shaped first sound indicator based on the first azimuth scale in the azimuth scale sequence, the first sound indicator being used for indicating that the vertical azimuth of the first sound source is the lower azimuth. In some embodiments, the display module is configured to display a downward-tapered first sound indicator based on the first azimuth scale in the azimuth scale sequence.

According to some embodiments, the display module 1901 is configured to display a first sound indicator having the vertical azimuth scale based on the first azimuth scale in the azimuth scale sequence, the vertical azimuth being used for indicating a pitch angle of the first sound source with respect to the first virtual character. In some embodiments, the display module is configured to display a first sound indicator having an arrow based on the first azimuth scale in the azimuth scale sequence, the arrow direction of the arrow being used for indicating the vertical azimuth of the first sound source. In some embodiments, the display module is configured to display a first sound indicator having the textual prompt based on the first azimuth scale in the azimuth scale sequence, the textual prompt being used for indicating a vertical azimuth of the first sound source.

According to some embodiments, the first sound source is used for producing a first sound, the visual effect of the first sound indicator further includes other visual effects, where the first visual effect and the other visual effects are different types of visual effects, and the other visual effects include at least one of the following visual effects:
- a second visual effect used for indicating a sound type of the first sound;
- a third visual effect used for indicating a sound volume of the first sound;
- a fourth visual effect used for indicating a sound distance of the first sound;
- a fifth visual effect used for indicating the frequency of action of the first sound.

According to some embodiments, the apparatus further includes:
- a determining module 1903 configured to determine a visual effect of the first sound indicator according to a sound parameter of the first sound.

According to some embodiments, the sound parameter includes a sound type, and the determining module 1903 is configured to:
- determine the second visual effect of the first sound indicator according to the sound type of the first sound.

According to some embodiments, the second visual effect includes a color of the first sound indicator or an icon pattern of the first sound indicator.

According to some embodiments, the first sound indicator is represented using an acoustic amplitude spectrum, the third visual effect includes an amplitude of the first acoustic amplitude spectrum, the sound parameter includes a sound volume, and the determining module 1903 is configured to determine the amplitude of the first acoustic amplitude spectrum according to an arriving sound volume of the first sound at the first virtual character.

According to some embodiments, the determining module 1903 is configured to determine an arriving sound volume of the first sound according to an original sound volume of the first sound and an influence parameter, and the influence parameter includes at least one of the following parameters:
- a distance between the first sound source and the first virtual character;
- equipment worn by the first virtual character;
- equipment worn by a second virtual character when the first sound source is the second virtual character;
- the material of the first sound source or the material to which the first sound source is exposed (exposed material).

According to some embodiments, for the same original sound volume, the arriving sound volume determined when the first virtual character is wearing an earphone is larger than the arriving sound volume determined when the first virtual character is not wearing the earphone; in some embodiments, for the same original sound volume, the arriving sound volume determined when the first virtual character is wearing a helmet is smaller than the arriving sound volume determined when the first virtual character is not wearing the helmet; in some embodiments, for the same original sound volume, the arriving sound volume determined when the second virtual character is wearing a muffler is smaller than the arriving sound volume determined when the first virtual character is not wearing the muffler.

According to some embodiments, the fourth visual effect includes a display-starting time of the first sound indicator, the sound parameter includes a sound propagation speed, and the determining module 1903 is configured to determine the display-starting time of the first sound indicator based on the sound propagation speed between the first sound source and the first virtual character, the display-starting time being later than a generation time of the first sound.

According to some embodiments, the first sound indicator is represented using an acoustic amplitude spectrum, the fifth visual effect includes a jitter frequency of the acoustic amplitude spectrum, the sound parameter includes a sound propagation speed, and the determining module 1903 is configured to determine the jitter frequency of the acoustic amplitude spectrum based on a frequency of action when the first sound is produced by the first sound source.

According to some embodiments, the visual effect of the first sound indicator includes: at least one of a shape, a pattern, a color, a texture, a text, an animation effect, a display-starting time, a display duration, and a blanking time of the first sound indicator.

According to some embodiments, the azimuth scale sequence in the compass information corresponds to a visible azimuth range of the first virtual character, and the display module 1901 is configured to display a second sound indicator indicating the presence of the second sound source along the horizontal azimuth indicated by the edge azimuth scale based on an edge azimuth scale in the azimuth scale sequence closest to the horizontal azimuth of the second sound source if the second sound source is present in the surroundings of the first virtual character and the horizontal azimuth of the second sound source is out of the visible azimuth range.

According to some embodiments, the display module 1901 is configured to cancel the display of the first sound prompter if the first virtual character enters a deaf state.

According to some embodiments, the determining module 1903 is configured to determine the sound with the highest sound volume among the at least two sounds as the first sound if the first sound source produces the at least two sounds and a time difference of generation of the at least two sounds is less than a threshold.

A person skilled in the art would understand that these "modules" and "units" could be implemented by hardware logic, a processor or processors executing computer software code, or a combination of both. The "modules" may also be implemented in software stored in a memory of a computer or a non-transitory computer-readable medium, where the instructions of each module are executable by a processor to thereby cause the processor to perform the respective operations of the corresponding module.

Some embodiments provide a computer device including a processor and a memory, the memory having stored therein at least one instruction loaded and executed by the processor to implement the virtual world sound-prompting method provided by the respective method embodiments described above. The computer device may be a terminal as provided in FIG. 20 below.

Figure 20:
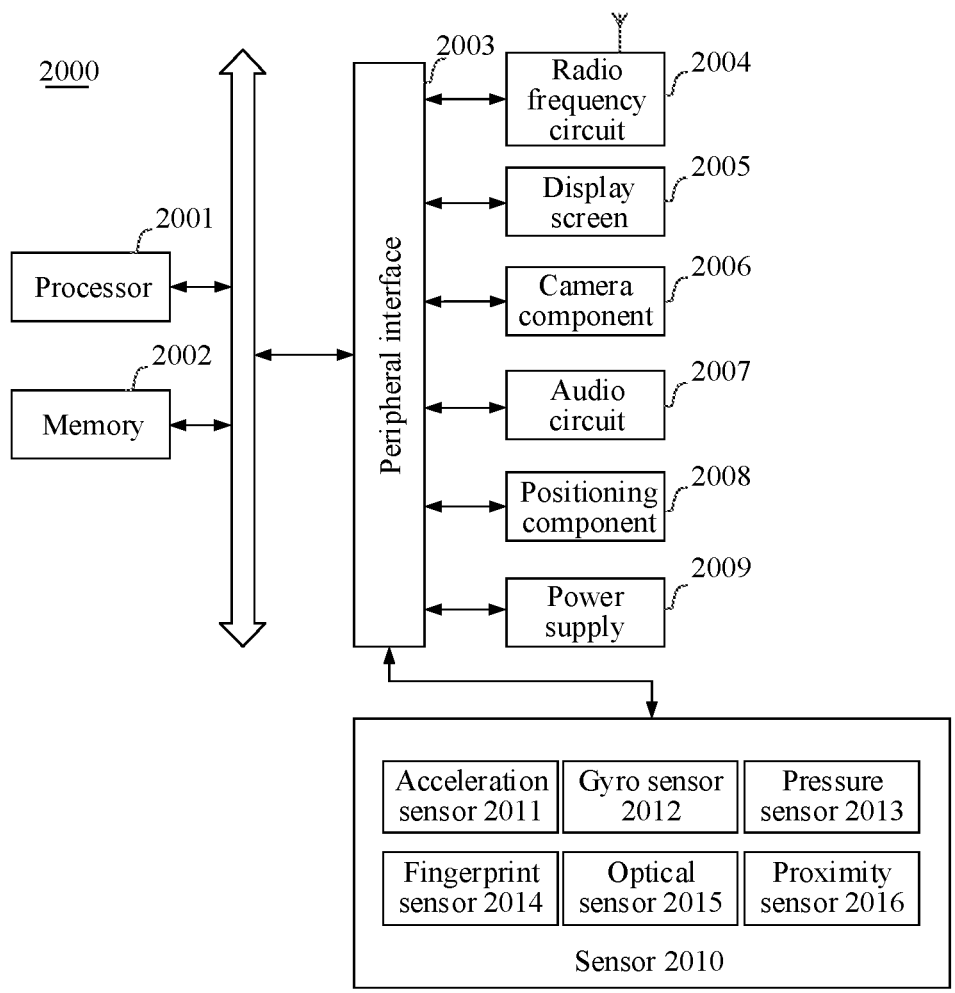
FIG. 20 is a schematic structural diagram showing a server according to some embodiments.

FIG. 20 is a schematic structural diagram of a computer device 2000 according to some embodiments. The computer device 2000 may be: a smartphone, a tablet computer, a Moving Picture Experts Group Audio Layer III (MP3) player, a Moving Picture Experts Group Audio Layer IV (MP4) player, a notebook computer, or a desktop computer. The computer device 2000 may also be referred to by other names as a user equipment, a portable terminal, a laptop terminal, a desktop terminal, etc.

Typically, the computer device 2000 includes: a processor 2001 and a memory 2002.

The processor 2001 may include one or more processing cores, for example, a 4-core processor or an 8-core processor. The processor 2001 may be implemented in at least one hardware form of a digital signal processor (DSP), a field-programmable gate array (FPGA), and a programmable logic array (PLA). The processor 2001 may also include a main processor and a coprocessor. The main processor is a processor used for processing data in an awake state, and is also referred to as a central processing unit (CPU). The coprocessor is a low power consumption processor used for processing the data in a standby state. In some embodiments, the processor 2001 may be integrated with a graphics processing unit (GPU). The GPU is used for rendering and drawing content that needs to be displayed on a display screen. In some embodiments, the processor 2001 may further include an artificial intelligence (AI) processor. The AI processor is used for processing computing operations related to machine learning.

The memory 2002 may include one or more computer-readable storage media. The computer-readable storage medium may be non-transient. The memory 2002 may further include a high-speed random access memory and a nonvolatile memory, for example, one or more disk storage devices or flash storage devices. In some embodiments, a non-transitory computer-readable storage medium in memory 2002 is used for storing at least one instruction for execution by processor 2001 to implement the virtual world sound-prompting method provided by some embodiments of the disclosure.

In some embodiments, the computer device 2000 may also include: a peripheral interface 2003 and at least one peripheral. The processor 2001, the memory 2002, and the peripheral interface 2003 may be connected through a bus or a signal cable. Each peripheral may be connected to the peripheral interface 2003 via a bus, a signal cable, or a circuit board. Specifically, the peripheral includes: at least one of a radio frequency circuit 2004, a display screen 2005, a camera 2006, an audio circuit 2007, a positioning component 2008, and a power supply 2009.

In some embodiments, the computer device 2000 also includes one or more sensors 2010. The one or more sensors 2010 include, but are not limited to: an acceleration sensor 2011, a gyro sensor 2012, a pressure sensor 2013, a fingerprint sensor 2014, an optical sensor 2015, and a proximity sensor 2016.

A person skilled in the art may understand that the structure shown in FIG. 20 constitutes no limitation on the computer device 2000, and the terminal may include more or fewer components than those shown in the figure, or some components may be combined, or a different component deployment may be used.

According to some embodiments, a computer-readable storage medium is further provided, which stores at least one program code loaded and executed by a processor to implement the virtual world sound-prompting method as described above.

According to some embodiments, also provided is a computer program product or computer program including computer instructions stored in a computer readable storage medium. A processor of a computer device reads the computer instructions from the computer-readable storage medium, and the processor executes the computer instructions to cause the computer device to perform the virtual world sound-prompting method as described above.

A person of ordinary skill in the art may understand that all or some of the operations of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. A virtual world sound-prompting method performed by a terminal, the virtual world sound-prompting method comprising:
    displaying a visual screen of a first virtual character, the visual screen displaying compass information comprising an azimuth scale corresponding to a facing direction of the first virtual character; and
    displaying a first sound indicator in the compass information based on a first sound source located in the virtual world, the first sound indicator indicating a horizontal azimuth and a vertical azimuth corresponding to the first sound source;
        wherein the first sound indicator is displayed at a position aligned with a first azimuth scale inside the compass information, the first azimuth scale indicating the horizontal azimuth of the first sound source, and the first sound indicator having a first visual aspect indicating the vertical azimuth of the first sound source, and
        wherein the first visual aspect comprises at least one of:
            a shape of the first sound indicator;
            a vertical azimuth scale associated with the first sound indicator;
            an arrow associated with the first sound indicator; or
            a text prompt associated with the first sound indicator.

2. The virtual world sound-prompting method according to claim 1, wherein the first visual aspect further comprises at least one of:
    an upward-tapered shape indicating that the first sound source is above the first virtual character, or
    a downward-tapered shape indicating that the first sound source is below the first virtual character.

3. The virtual world sound-prompting method according to claim 1, wherein the first visual aspect further comprises at least one of:
    the vertical azimuth scale indicating a pitch angle of the first sound source with respect to the first virtual character,
    the arrow with a pointing direction indicating the vertical azimuth of the first sound source, or
    the text prompt indicating the vertical azimuth of the first sound source.

4. The virtual world sound-prompting method according to claim 1, wherein the first sound indicator has a second visual aspect indicating at least one of a sound type or a sound volume associated with the first sound source.

5. The virtual world sound-prompting method according to claim 4, wherein the sound volume corresponds to a sound caused by the first sound source after traveling through a sound distance between the first sound source and the first virtual character.

6. The virtual world sound-prompting method according to claim 5 further comprising:
 determining the sound volume based on the sound distance.

7. The virtual world sound-prompting method according to claim 6 further comprising:
 determining the sound volume based on an attribute of a space associated with the sound distance.

8. The virtual world sound-prompting method according to claim 5, wherein the first sound indicator is displayed when the sound arrives at the first virtual character.

9. The virtual world sound-prompting method according to claim 4, wherein the second visual aspect comprises at least one of a color or an icon indicating the sound type of the first sound source.

10. The virtual world sound-prompting method according to claim 4, wherein the second visual aspect comprises an acoustic amplitude spectrum, and wherein an amplitude of the acoustic amplitude spectrum indicates the sound volume of a sound caused by the first sound source in time domain.

11. The virtual world sound-prompting method according to claim 9, wherein a sound caused by the first sound source is caused by a sequence of actions of the first sound source, and wherein the acoustic amplitude spectrum reflects the sequence of actions in time domain.

12. The virtual world sound-prompting method according to claim 1, wherein the compass information comprises a range of azimuth scales centered on the azimuth scale corresponding to the facing direction of the first virtual character, and wherein the first sound indicator is displayed at one end of the range of azimuth scales when the horizontal azimuth of the first sound source is outside the range of azimuth scales.

13. The virtual world sound-prompting method according to claim 1, wherein the method further comprises:
 determining a sound volume based on an listening attribute of the first virtual character.

14. An apparatus for virtual world sound-prompting, the apparatus comprising:
 at least one memory configured to store program code; and
 at least one processor configured to read the program code and operate as instructed by the program code, the program code including:
  first displaying code configured to cause the at least one processor to display a visual screen of a first virtual character, the visual screen displaying compass information comprising an azimuth scale corresponding to a facing direction of the first virtual character; and
  second displaying code configured to cause the at least one processor to display a first sound indicator in the compass information based on a first sound source located in the virtual world, the first sound indicator indicating a horizontal azimuth and a vertical azimuth corresponding to the first sound source,
 wherein the first sound indicator is displayed at a position aligned with a first azimuth scale inside the compass information, the first azimuth scale indicating the horizontal azimuth of the first sound source, and the first sound indicator having a first visual aspect indicating the vertical azimuth of the first sound source, and
 wherein the first visual aspect comprises at least one of:
  a shape of the first sound indicator;
  a vertical azimuth scale associated with the first sound indicator;
  an arrow associated with the first sound indicator; or
  a text prompt associated with the first sound indicator.

15. The apparatus of claim 14, wherein the first visual aspect further comprises at least one of:
 an upward-tapered shape indicating that the first sound source is above the first virtual character, or
 a downward-tapered shape indicating that the first sound source is below the first virtual character.

16. A non-transitory computer-readable medium storing instructions, the instructions comprising: one or more instructions that, when executed by one or more processors of a device for virtual world sound-prompting, cause the one or more processors to:
 display a visual screen of a first virtual character, the visual screen displaying compass information comprising an azimuth scale corresponding to a facing direction of the first virtual character; and
 display a first sound indicator in the compass information based on a first sound source located in the virtual world, the first sound indicator indicating a horizontal azimuth and a vertical azimuth corresponding to the first sound source,
 wherein the first sound indicator is displayed at a position aligned with a first azimuth scale inside the compass information, the first azimuth scale indicating the horizontal azimuth of the first sound source, and the first sound indicator having a first visual aspect indicating the vertical azimuth of the first sound source, and
 wherein the first visual aspect comprises at least one of:
  a shape of the first sound indicator;
  a vertical azimuth scale associated with the first sound indicator;
  an arrow associated with the first sound indicator; or
  a text prompt associated with the first sound indicator.

* * * * *